(12) United States Patent
Suganuma et al.

(10) Patent No.: US 9,177,425 B2
(45) Date of Patent: Nov. 3, 2015

(54) VEHICLE DATA ANALYSIS APPARATUS, VEHICLE DATA ANALYSIS METHOD, AND DEFECT DIAGNOSIS APPARATUS

(75) Inventors: Hideaki Suganuma, Yokohama (JP); Takeshi Matsumura, Chofu (JP); Toshiro Hikita, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/005,838

(22) PCT Filed: Mar. 19, 2012

(86) PCT No.: PCT/JP2012/057030
§ 371 (c)(1),
(2), (4) Date: Nov. 21, 2013

(87) PCT Pub. No.: WO2012/128256
PCT Pub. Date: Sep. 27, 2012

(65) Prior Publication Data
US 2014/0095016 A1    Apr. 3, 2014

(30) Foreign Application Priority Data

Mar. 22, 2011 (JP) ................................ 2011-063202

(51) Int. Cl.
*G07C 5/00* (2006.01)
*G06F 15/00* (2006.01)
*G05B 23/02* (2006.01)

(52) U.S. Cl.
CPC .............. *G07C 5/00* (2013.01); *G05B 23/0221* (2013.01); *G06F 15/00* (2013.01)

(58) Field of Classification Search
CPC ....... G06F 15/00; G07C 5/00; G05B 23/0221
See application file for complete search history.

(56) References Cited

U.S. PATENT DOCUMENTS

2010/0185414 A1* 7/2010 Yamamoto .................... 702/183
2011/0264424 A1   10/2011 Miwa et al.

FOREIGN PATENT DOCUMENTS

| JP | 10 24784 | 1/1998 |
|---|---|---|
| JP | 2004-20477 | 1/2004 |
| JP | 2005 257416 | 9/2005 |
| JP | 2006-224892 | 8/2006 |
| JP | 2007-58344 A | 3/2007 |
| JP | 2007-198290 | 8/2007 |
| JP | 2008 14912 | 1/2008 |

(Continued)

OTHER PUBLICATIONS

International Search Report Issued May 1, 2012 in PCT/JP12/057030 Filed Mar. 19, 2012.

*Primary Examiner* — John Q Nguyen
*Assistant Examiner* — Michael Kerrigan
(74) *Attorney, Agent, or Firm* — Oblon, McClelland, Maier & Neustadt, L.L.P.

(57) ABSTRACT

A vehicle data analysis apparatus analyzes vehicle data that indicates chronological change of a vehicle state. The vehicle data analysis apparatus is provided with a computing unit and a recognition unit. The computing unit is configured to make obvious data fluctuation accompanying the development, in the vehicle data, of mechanical or control-related fault in a vehicle control system. The recognition unit is configured to recognize the vehicle data to be considered during vehicle fault diagnosis on the basis of a result of computation by the computing unit.

17 Claims, 13 Drawing Sheets

(56) References Cited

FOREIGN PATENT DOCUMENTS

| JP | 2009 294004 | 12/2009 |
| JP | 2010 102538 | 5/2010 |
| JP | 2010 122847 | 6/2010 |
| JP | 2010-203841 | 9/2010 |

\* cited by examiner

| SENSOR DATASETS | CONTROL DATASETS |
|---|---|
| ACCELERATOR SENSOR | AMOUNT OF ENGINE CONTROL |
| STEERING SENSOR | AMOUNT OF VSC CONTROL |
| . | . |
| . | . |

VALUE DETECTED
BY ACCELERATOR SENSOR
(SENSOR DATASETS)

SENSOR DATASET
DISTRIBUTION

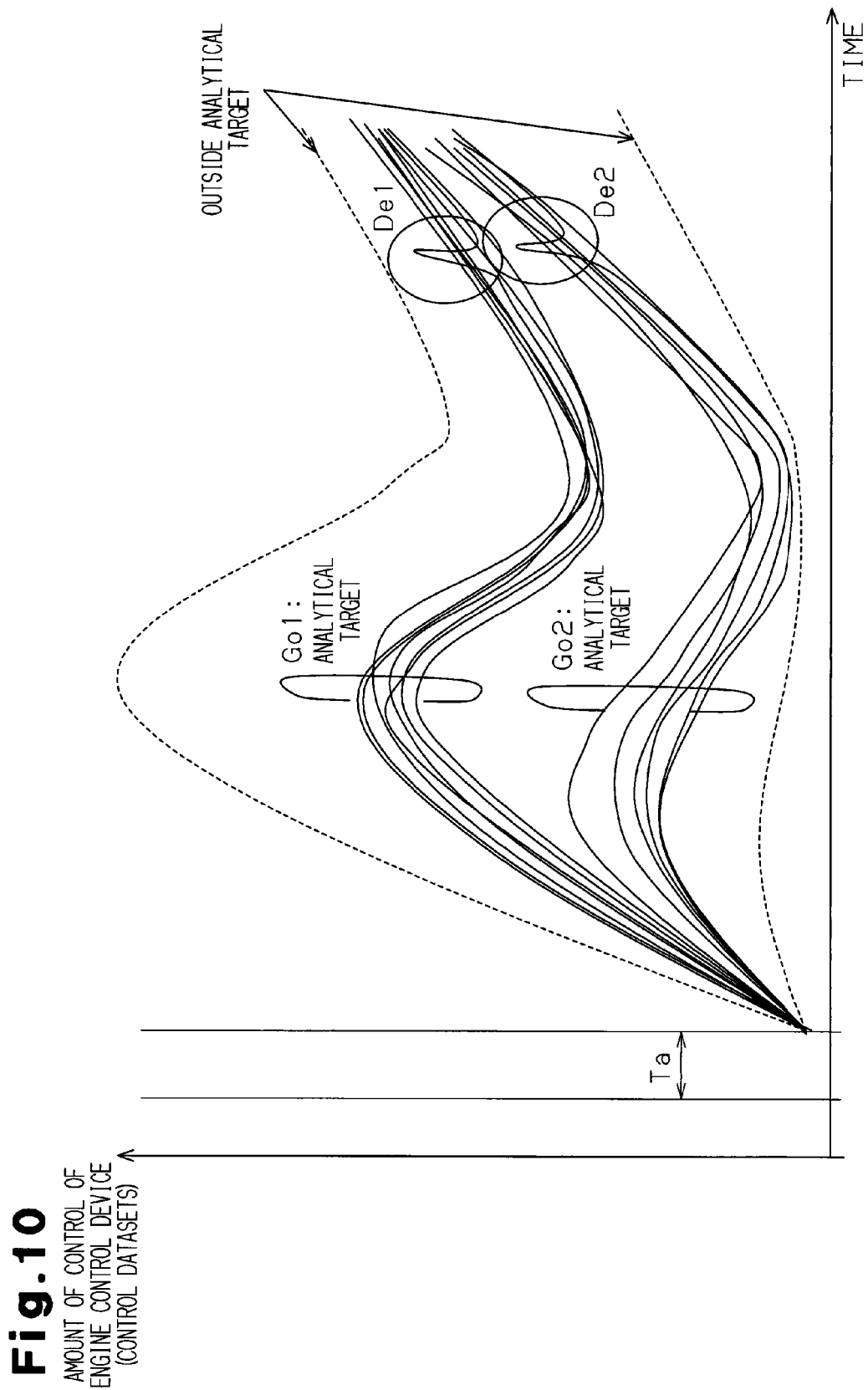

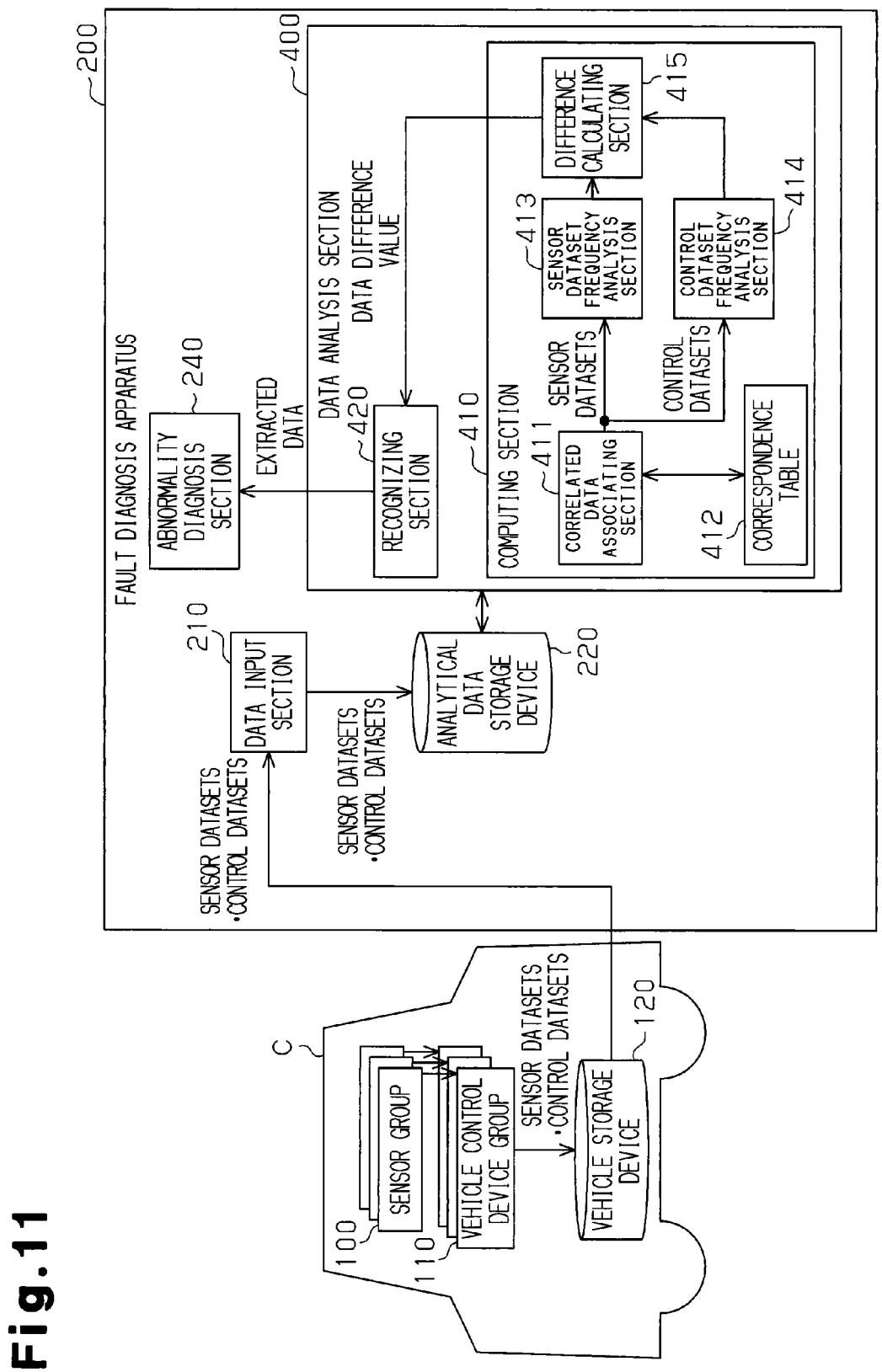

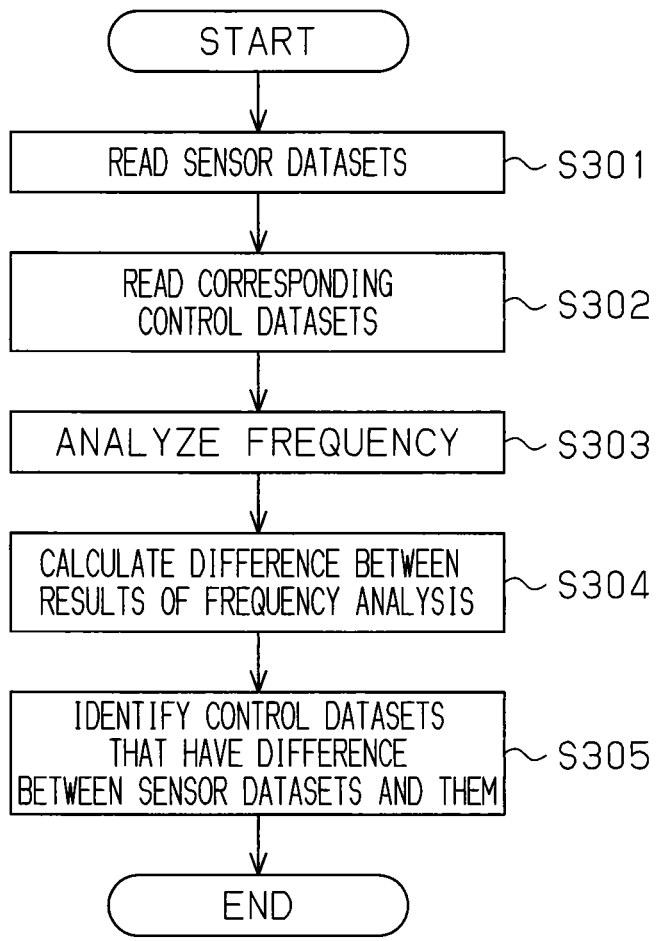

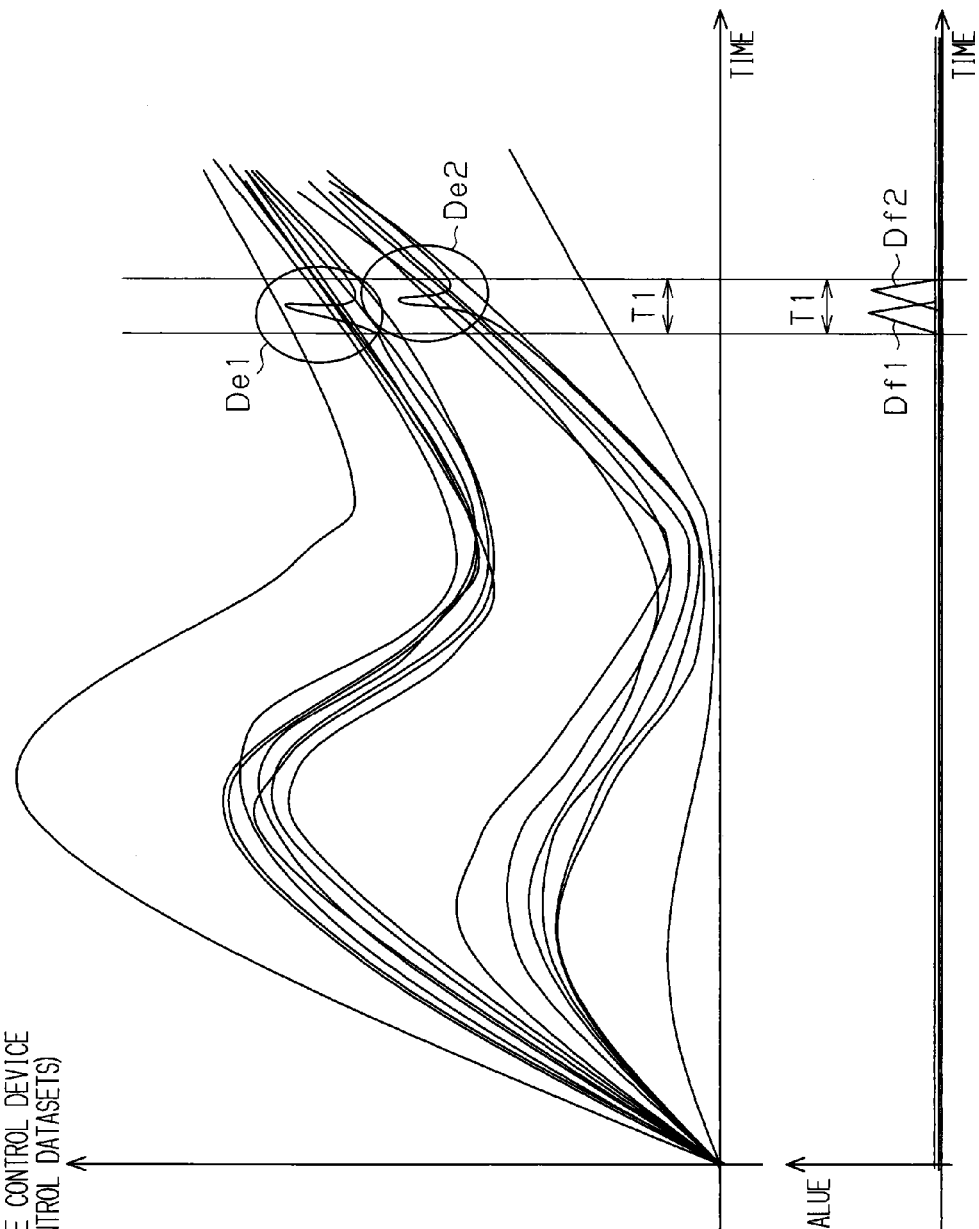
Fig.13(a) AMOUNT OF CONTROL OF ENGINE CONTROL DEVICE (CONTROL DATASETS)
Fig.13(b) FFT DIFFERENCE VALUE

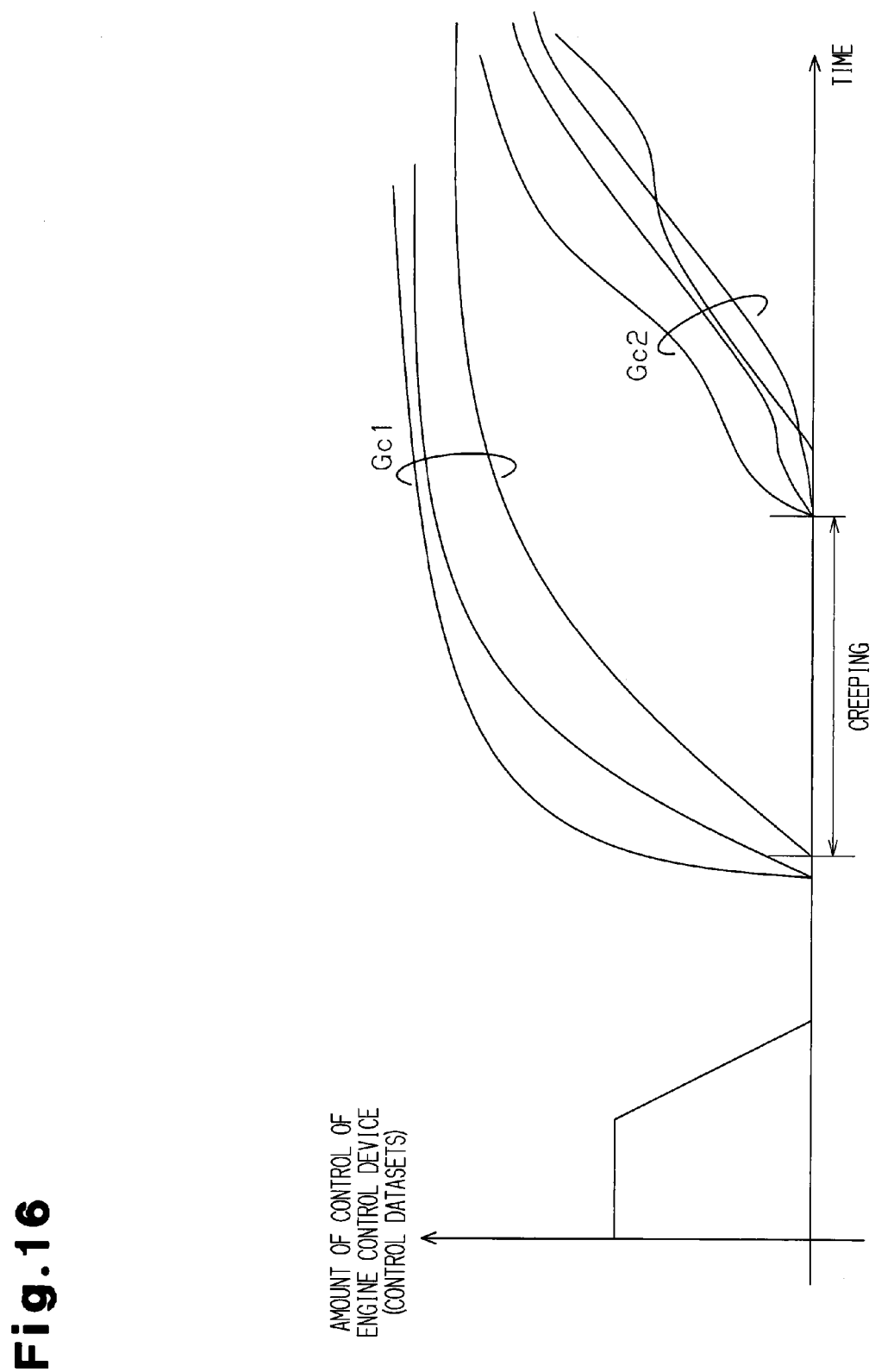

VEHICLE DATA ANALYSIS APPARATUS, VEHICLE DATA ANALYSIS METHOD, AND DEFECT DIAGNOSIS APPARATUS

FIELD OF THE DISCLOSURE

The present invention relates to a vehicle data analysis apparatus and vehicle data analysis method for analyzing a vehicle data indicating time-series changes of the state of a vehicle. Also, the present invention relates to a fault diagnosis apparatus using the vehicle data analysis apparatus.

BACKGROUND OF THE DISCLOSURE

Generally, in operation tests or the like for various vehicle devices mounted in a vehicle, the state of the vehicle is subject to diagnosis based on vehicle data that indicates time-series changes, such as the amount of control, obtained through programs performed by each of the vehicle control devices. For such a diagnosis, as described in, for example, Patent Document 1, a vehicle data analysis apparatus is known that carries out analysis by using model data obtained when the vehicle is in a normal state. Specifically, this vehicle data analysis apparatus registers, as model data, vehicle data obtained in advance for running conditions of the vehicle, such as the running speed of the vehicle, road gradient, or when using an air conditioner. To subject a state of the vehicle to diagnosis, a vehicle dataset including an abnormal portion resulting from an abnormality in the vehicle is identified through comparing a dataset obtained when the vehicle is in a normal state, which is used as the model dataset, with a vehicle dataset obtained from the vehicle control device for analysis. The vehicle dataset is thus identified, and this identified vehicle dataset is used to, for example, discover the cause of an abnormality in the state of the vehicle.

PRIOR ART DOCUMENTS

Patent Documents

Patent Document 1: Japanese Laid-Open Patent Publication No. 2009-294004

SUMMARY OF THE INVENTION

Problems that the Invention is to Solve

Since the state of a vehicle running on an actual road variously changes according to, for example, traffic factors, a driver's habit in driving, or the like, it is difficult to form data models reflecting all states. Therefore, if any difference between the data model and the vehicle dataset obtained by the vehicle control device in order to be subject to diagnosis occurs as a result of differences between such running conditions for the vehicle, even a normal vehicle dataset might be erroneously determined as a vehicle dataset that includes an abnormal factor.

The continually-changing vehicle state is reflected in such vehicle data directly and faithfully. It is difficult to determine whether such data fluctuations result from changes in the running state of the vehicle or from mechanical or control-related abnormalities in a vehicle control system. Such a difficulty in determination contributes to the cause of degradation in accuracy in identifying vehicle data to be subject to diagnosis.

The object of the present invention is to provide a vehicle data analysis apparatus and vehicle data analysis method that are able to highly accurately identify a vehicle dataset to be subject to diagnosis without using any data model, and to provide a fault diagnosis apparatus that uses the vehicle data analysis apparatus.

Means for Solving the Problems

In accordance with one aspect of the present disclosure, a vehicle data analysis apparatus for analyzing vehicle data indicating time-series changes of a state of a vehicle is provided. The apparatus includes a computing section and a recognizing section. The computing section is configured to uncover a data fluctuation in the vehicle data that results from a mechanical or control-related abnormality in a vehicle control system. The recognizing section is configured to recognize, based on a computation result obtained by the computing section, vehicle data to be subject to a diagnosis of the abnormality in the vehicle as a diagnosis target.

In accordance with another aspect of the present invention, a vehicle data analysis method for analyzing vehicle data indicating time-series changes of a state of a vehicle is provided. The method includes: uncovering a data fluctuation in the vehicle data that results from a mechanical or control-related abnormality in a vehicle control system; and identifying the vehicle data that has the uncovered data fluctuation to be subject to diagnosis of the abnormality in the vehicle as a diagnosis target.

Since the vehicle data reflect the running state of the vehicle, the vehicle data usually includes a data fluctuation resulting from this running state of the vehicle. Such a data fluctuation resulting from a change in the running state of the vehicle has a large frequency component, and the degree of its influence on vehicle data is high. In contrast, a data fluctuation resulting from a mechanical or control-related abnormality in a vehicle control system is far smaller in frequency component than a data fluctuation resulting from the running state of the vehicle, and is very weak in its influence on vehicle data. Therefore, it is difficult to identify, from among such vehicle data reflecting the running state of the vehicle, vehicle data that includes a data fluctuation resulting from a mechanical or control-related abnormality in the vehicle control system. Vehicle data as described above has been categorized into more different types due to the more complicated vehicle control system. Therefore, it is difficult to identify vehicle data that includes an abnormal factor used in fault diagnosis of the vehicle by analyzing each of such vehicle data. In view of the foregoing disadvantage, for example, vehicle data that includes an abnormal data fluctuation may be identified by subjecting vehicle data accumulated in the vehicle to a statistical process. In this case, such identification of the vehicle data tends to suffer from the problem described below. That is, although the vehicle control system itself is in a normal state, the vehicle data that includes a peculiar data fluctuation resulting from a change in the running state of the vehicle tends to be identified, among the vehicle data, as vehicle data that includes an abnormal factor.

Therefore, as with the configuration or method described above, computation is performed to uncover a data fluctuation included in the vehicle data, which data fluctuation results from a mechanical or control-related abnormality in the vehicle control system. Vehicle data to be subject to diagnosis are recognized from among these uncovered vehicle data. As a result, a data fluctuation resulting from a mechanical or control-related abnormality in the vehicle control system, which is actually to be regarded as an abnormal factor, is more uncovered than a data fluctuation resulting from a change or the like in the running state of the vehicle. Accordingly, from among various vehicle data accumulated in the vehicle as necessary, vehicle data that includes a data fluctuation resulting from a mechanical or control-related abnormality in the vehicle control system can be recognized precisely. Accordingly, through such recognition vehicle data to be subject to diagnosis can be identified highly accurately.

With the foregoing configuration or method, a data fluctuation resulting from a mechanical or control-related abnormality in the vehicle control system can be uncovered. Accordingly, based on whether analyzed vehicle data include the uncovered data fluctuation or not, vehicle data to be subject to diagnosis can be identified. Therefore, the need to use data models is eliminated in the identification of vehicle data that includes an abnormal factor. That is, from among vehicle data that exhibits various changes, vehicle data to be subject to diagnosis can be identified highly accurately.

In accordance with one form of the present disclosure, the vehicle data includes, as data reflecting a characteristic of a driver's operation of the vehicle, a sensor dataset and a control dataset, the sensor dataset indicating changes of a value detected by a sensor that detects the state of the vehicle, and the control dataset reflecting changes of the sensor dataset. The recognizing section is configured to, based on the computation result obtained by the computing section, identify, as the diagnosis target, vehicle data that includes a data fluctuation based on a factor different from the driver's vehicle operation of the vehicle.

In accordance with one form of the present disclosure, the vehicle data includes, as data reflecting a characteristic of a driver's operation of the vehicle, a sensor dataset and a control dataset, the sensor dataset indicating changes of a value detected by a sensor that detects the state of the vehicle, and the control dataset reflecting changes of the sensor dataset. The identification is to identify, as the diagnosis target, vehicle data that includes a data fluctuation based on a factor different from the driver's vehicle operation of the vehicle.

Generally, the vehicle data roughly comprises: sensor datasets that exhibit time-series changes of values detected by an accelerator sensor, a brake sensor and so on, that detect the state of the vehicle; and control datasets that exhibit time-series changes of the amounts of control in various control devices and so on, which amounts of control are determined based on the results of detection by the various sensors. That is, vehicle data concerning the vehicle control device can be divided into sensor datasets that are data input to the vehicle control device, and control datasets that are data output to the sensor datasets. Therefore, a fixed correlation exists between the sensor and control datasets input or output by the vehicle control device. In contrast, the sensor datasets indicating the state of the vehicle closely reflects the characteristic of the driver's operation of the vehicle. For example, the time-series changes of a value detected by the accelerator sensor change in proportion to the amount of depression of the accelerator pedal by a driver. Consequently, the time-series changes of the amount of control of the engine control, which controls the engine, change greatly based on the result of detection by the accelerator sensor. For the foregoing reasons, many data fluctuations included in the sensor datasets and control datasets result from the driver's operation of the vehicle. Therefore, even if the vehicle data include a peculiar data fluctuation resulting from the driver's having performed an acceleration or turning operation suddenly, the vehicle data including this data fluctuation does not indicate any abnormality in the vehicle control system, and hence are not the vehicle data to be subject to fault diagnosis for the vehicle.

As with the configuration or method described above, vehicle data that includes a data fluctuation based on a factor other than the driver's operation of the vehicle, that is, a data fluctuation resulting from a mechanical or control-related abnormality in the vehicle control system to be actually diagnosed is identified through the computations for the sensor datasets and control datasets. Therefore even if a data fluctuation resulting from the driver's peculiar operation of the vehicle is included in sensor datasets or control datasets, the vehicle data including a data fluctuation resulting from any human factor is prevented from being erroneously identified as the vehicle data to be subject to diagnosis. Accordingly, while the vehicle data closely reflect the effect of the driver's operation of the vehicle, the diagnosis target can be identified precisely.

In accordance with one form of the present disclosure, as the computation, the computing section obtains the amount of change in the vehicle data per unit time. The computing section also performs a computation to identify vehicle data that indicates that the calculated amount of change is equal to or greater than a threshold value that indicates an amount of change caused by data fluctuation resulting from mechanical or control-related abnormality in the vehicle control system.

In accordance with one form of the present disclosure, the uncovering is to obtain the amount of change in the vehicle data per unit time. The identification is to select vehicle data that indicates that the calculated amount of change per unit time in the vehicle data is equal to or greater than a threshold value that indicates an amount of change caused by data fluctuation resulting from the mechanical or control-related abnormality in the vehicle control system.

It is known that, generally, the width of a data fluctuation resulting from a fluctuation correlates with the behavior of the driver of the vehicle. In contrast, the inventors have confirmed that the width of a data fluctuation resulting from a mechanical or control-related abnormality in the vehicle control system is several milliseconds. That is, they have confirmed that the amount of change per unit time in data fluctuation resulting from a mechanical or control-related abnormality in the vehicle control system is greater than that resulting from a human factor.

As with the configuration or method described above, the amount of change per unit time in the vehicle data is obtained. Additionally, a determination is made whether the obtained amount of change results from a data fluctuation resulting from a mechanical or control-related abnormality in the vehicle control system, which changes in several milliseconds. Accordingly, it is possible to identify, from the amount of data fluctuation per unit time, the vehicle data that includes a data fluctuation resulting from a mechanical or control-related abnormality in the vehicle control system.

In accordance with one form of the present disclosure, the vehicle data analysis apparatus further includes a storage device in which the vehicle data is accumulated. As the computation, the computing section performs a computation for obtaining statistical distribution of the vehicle data stored in the storage device. The recognizing section is configured to perform a process in which the recognizing section recognizes vehicle data located around a median in the obtained statistical distribution, and extracts vehicle data that has a relatively large deviation in the recognized vehicle data from the storage device as the diagnosis target vehicle data.

In accordance with one form of the present disclosure, the vehicle data analysis method further includes accumulation of the vehicle data. The uncovering is to obtain statistical distribution of the stored vehicle data. The identification is to recognize vehicle data located around a median in the vehicle data represented as a statistical distribution and to identify vehicle data that has a relatively large deviation among the recognized vehicle data as the diagnosis target vehicle data.

Generally, in a statistical distribution obtained for the vehicle data, whereas average vehicle data common in change or pattern tend to cluster in the middle, the vehicle data peculiar in change or pattern tend to deviate from the median. Such a distribution greatly reflects a data fluctuation resulting from the running state of the vehicle, which data fluctuation has a large frequency component and hence increases its influence on the vehicle data. Specifically, vehicle data groups distributed around a median indicate similar changes and patterns reflecting the driver's normal operation of the vehicle, and indicate a collection of average vehicle data from which vehicle data including a data fluctuation resulting from the driver's peculiar operation of the vehicle are excluded. On the other hand, the vehicle data that has large deviations among the vehicle data groups distributed around such a median may probably include data fluctuation that has arisen as a result of a cause other than a human factor.

Therefore, as with the configuration or method described above, a vehicle data group located around a median in the statistical distribution is extracted, thereby making it easy to identify, from the extracted vehicle data group, the vehicle data that includes data fluctuation resulting from a mechanical or control-related abnormality in the vehicle control system.

In accordance with one form of the present disclosure, the computing section is configured to obtain, in the computation, a difference between the sensor dataset and the control dataset correlated with the sensor dataset. Based on the obtained difference, the recognizing section recognizes the diagnosis target vehicle data.

In accordance with one form of the present disclosure, the uncovering is to uncover a data fluctuation resulting from the mechanical or controls-related abnormality in the vehicle control system based on a difference between the sensor dataset and the control dataset correlated with the sensor dataset.

For example, the time-series changes of a value detected by an accelerator sensor, which detects the amount of depression of the accelerator pedal of the vehicle by a driver, correlates with changes of the amount of control of an engine control device, which controls an engine based on the result of this detection. Therefore, changes or patterns of the control datasets reflecting the time-series changes of the sensor datasets follow changes of the sensor datasets, and are the same as changes or patterns of the sensor datasets. As a result, the difference between the control datasets and the sensor datasets decreases naturally. Therefore, obtaining the difference between the sensor datasets and control datasets makes it possible to offset a data fluctuation resulting from the driver's operation of the vehicle. In contrast, if there is a difference between the sensor datasets and control datasets correlated with each other, such a difference may probably have arisen as a result of a factor other than a human factor, that is, as a result of a mechanical or control-related abnormality in the vehicle control system.

Therefore, with the configuration or method described above, by calculating the difference between the sensor datasets and control datasets, a data fluctuation resulting from a mechanical or control-related abnormality in the vehicle control system is uncovered naturally. That is, using the sensor datasets as a filter to exclude a data fluctuation included in the control datasets, which has resulted from a human factor, the vehicle data actually to be subject to diagnosis can be identified easily without being affected by a data fluctuation resulting from a human factor.

In accordance with one form of the present disclosure, the computing section calculates the difference between the sensor dataset and the control dataset corresponding to the sensor dataset based on the sensor dataset and the control dataset that have been subjected to frequency analysis.

In accordance with one form of the present disclosure, the uncovering is to subject the sensor dataset and the control dataset corresponding to the sensor dataset to frequency analysis and to calculate the difference between the sensor dataset and the control dataset based on the sensor dataset and the control dataset that have been subjected to the frequency analysis.

As with the configuration or method, sensor datasets and control datasets corresponding to the sensor datasets are subjected to frequency analysis, and the difference between the sensor datasets and control datasets are obtained from the result of the analysis, thereby uncovering the data fluctuation more easily and precisely.

In accordance with one form of the present disclosure, the vehicle data includes the sensor dataset that indicates changes of the value detected by the sensor, which detects the state of the vehicle, and the control dataset reflecting, as data corresponding to the sensor dataset, changes of the corresponding sensor dataset. The sensor dataset and the control dataset are associated with each other as a result of determination that they are highly correlated with each other on condition that: a. time-series changes correlate with each other; and b. delay time of the control dataset with respect to the sensor dataset is within the response time of a vehicle's behavior with respect to the driver's operation of the vehicle, the response time being indicated by the sensor dataset.

Generally, the time-series changes of the control datasets of a vehicle control device the amount of control of which is determined based on sensor datasets, tend to be similar to the time-series changes of the sensor datasets. Usually, a delay time of several hundred milliseconds arises between such sensor datasets and control datasets, as the response time for vehicle behavior with respect to the driver's operation of the vehicle. Therefore even when certain sensor datasets and control datasets are similar to each other in time-series change, it is highly probable that the control datasets may correspond to other sensor datasets when the respective time-axis deviations of the data exceed a normally expected response time or, conversely, when the data changes along almost the same time axis without having response times. When the time-series changes of certain sensor datasets and control datasets are similar to each other and their respective response times fall within a prescribed range, the probability of a correlation between the sensor datasets and control datasets is extremely high. Therefore, with this configuration, sensor datasets and control datasets highly correlated with each other can be related to with each other precisely among various vehicle data based on two factors: the respective time-series changes and response times (delay times) of the sensor datasets and control datasets and response.

In accordance with one form of the present disclosure, the vehicle data analysis apparatus further includes a correspondence table representing a correspondence between vehicle data of a plurality of types. In the correspondence table, the sensor dataset indicating changes of the value detected by the sensor that detects the state of the vehicle and the control dataset highly correlated with the sensor dataset are related to each other.

As with the configuration described above, using a correspondence table in which sensor datasets and control datasets highly correlated with each other are related to each other in advance, the sensor datasets and control datasets correlated with each other can be identified easily simply by referring to this correspondence table. Accordingly, processing load is reduced when; using such highly correlated sensor and control datasets, data fluctuation is uncovered.

In accordance with one form of the present disclosure, in the correspondence table, as a sensor dataset and a control dataset highly correlated with each other, a dataset indicating changes of a value detected from an accelerator pedal of the vehicle and a dataset indicating changes of the amount of control of an engine control device for controlling an engine installed in the vehicle are registered in relation to each other. A dataset indicating changes of the amount of operation of a steering wheel of the vehicle and a dataset indicating changes of the amount of control of a VSC control device for exerting stability control for the vehicle are also registered in relation to each other.

Among the vehicle data, the sensor datasets and the control datasets stated above are highly correlated with each other, and are important data as diagnosis targets for fault diagnosis in the vehicle. Therefore, as with the configuration described above, using a correspondence table in which the various sensor datasets and various control datasets described above are represented in correspondence with each other in advance, allows for a smoother analysis of significant vehicle data.

In accordance with one form of the present disclosure, a fault diagnosis apparatus includes any one of the above vehicle data analysis apparatuses as a vehicle data analysis apparatus for analyzing vehicle data indicating time-series changes of a state of a vehicle. The fault diagnosis apparatus diagnoses the presence or absence of any fault in the vehicle based on the vehicle data analyzed by the vehicle data analysis apparatus.

This configuration is especially effective in the application of a fault diagnosis apparatus that diagnoses the presence or absence of a fault in the vehicle, based on the vehicle data analyzed by the vehicle data analysis apparatus described above. Therefore, according to the configuration described above, a vehicle abnormality can be diagnosed smoothly and highly accurately by using the vehicle data that has been analyzed and determined to be highly likely to include an abnormal factor.

BRIEF DESCRIPTION OF THE DRAWINGS

FIG. 4($b$) is a diagram showing an example of changes of the amount per unit time of change in the control datasets and also showing the analysis of the vehicle data according to the first embodiment;

FIG. 5($b$) is a time chart showing examples of changes of the amount of the control of an engine control device, which amount is determined based on the result of the detection by the accelerator sensor;

FIG. 9($b$) is an example of a statistical distribution obtained based on the value detected by the accelerator sensor;

FIG. 10 is a time chart, corresponding to FIG. 9($a$), which shows an example of the analysis of the vehicle data according to the second embodiment, together with examples of changes of the amount of the control of an engine control device, which amount is determined based on the result of the detection by the accelerator sensor;

FIG. 11 is a block diagram of a schematic configuration of a vehicle data analysis apparatus and fault diagnosis apparatus in a vehicle data analysis apparatus, vehicle data analysis method, and fault diagnosis apparatus according to a third embodiment of the present invention, and also a block diagram of a schematic configuration of an apparatus in which the vehicle data analysis method according to the present embodiment is applied;

FIG. 12 is a flowchart of an example of a vehicle data analysis procedure and fault diagnosis procedure according to the third embodiment;

FIG. 13($a$) is a time chart showing examples of changes of the amount of the control of an engine control device, which amount is determined based on the result of detection by an accelerator sensor;

FIG. 13($b$) is a diagram showing the difference between the sensor datasets and control datasets, as an example of the analysis of the vehicle data according to the third embodiment;

FIG. 16 is a time chart showing an example of a vehicle data analysis procedure and fault diagnosis procedure in another embodiment of a vehicle data analysis apparatus, vehicle data analysis method, and fault diagnosis apparatus according to the present invention.

DETAILED DESCRIPTION OF THE PREFERRED EMBODIMENTS

FIGS. 1 to 5 illustrate a first embodiment of a vehicle data analysis apparatus, a vehicle data analysis method, and a fault diagnosis apparatus according to the present invention. The vehicle data analysis apparatus, vehicle data analysis method, and fault diagnosis apparatus according to the present embodiment analyze data collected from a vehicle such as an automobile to be subject to diagnosis, and diagnose the presence or absence of faults. The vehicle data analysis apparatus, vehicle data analysis method, and fault diagnosis apparatus according to the present embodiment subject the vehicle data obtained from a vehicle to statistical processing, thereby analyzing the data.

Figure 1:
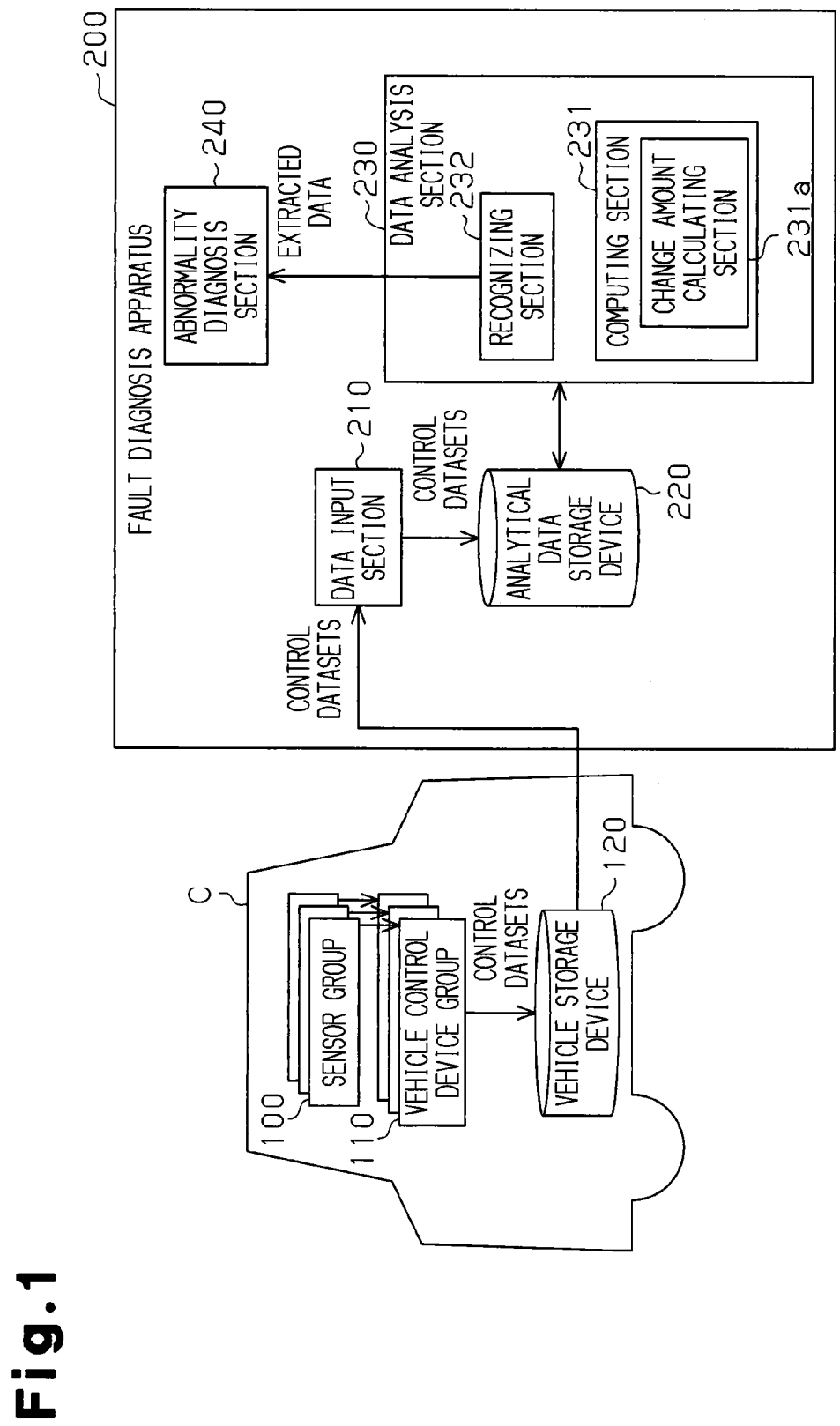
FIG. 1 is a block diagram of a schematic configuration of a vehicle data analysis apparatus and fault diagnosis apparatus in a vehicle data analysis apparatus, vehicle data analysis method, and fault diagnosis apparatus according to a first embodiment of the present invention, and also a block diagram of a schematic configuration of an apparatus in which the vehicle data analysis method according to the present embodiment is applied.

As shown in FIG. 1, a vehicle C to be subject to diagnosis is equipped with a group of sensors 100 that detect the state of the vehicle C.

The sensor group 100 comprises, for example, an accelerator sensor for detecting the amount of depression of an accelerator pedal by a driver of a vehicle C, a brake sensor for detecting the amount of depression of a braking pedal, an acceleration sensor for detecting acceleration of the vehicle C, and a gyro sensor for detecting the travelling direction of the vehicle C. Additionally, the sensor group 100 comprises, for example, a steering angle sensor for detecting the amount of change in the steering angle of a steering wheel, a vehicle speed sensor for detecting the rotational speed of each vehicle wheel, and a yaw rate sensor for detecting a yaw rate, that is, the speed of change in the rotation angle of the vehicle C in a turning direction of the vehicle C. Data indicating the time-series change of the detection values of the sensor group 100 are used as sensor datasets for the sensor group 100.

The vehicle C is equipped with a group of vehicle control devices 110, each of which, based on the detection result of the sensor group 100, controls various devices and systems mounted in the vehicle C. The vehicle control device group 110 comprises, for example, an engine control device that controls the operating state of the engine of the vehicle C based on the value detected by the accelerator sensor, and a brake control device that controls the brake of the vehicle C based on the value detected by the brake sensor. Additionally, the vehicle control device group 110 comprises, for example, a steering control device for controlling the steering of the vehicle C based on the value detected by the steering angle sensor, and a VSC control device that exerts vehicle stability control (VSC) based on the values detected by the steering angle sensor and yaw rate sensor. As described above, various sensor detection results (sensor datasets) required for the control of a control target by each vehicle control device are input to the vehicle control device group 110 as necessary.

The vehicle control device group 110 sequentially outputs control datasets, which indicates the time-series changes of control amount for controlling a control target, to a vehicle storage device 120 mounted in the vehicle C. Accordingly, the control datasets for the vehicle control device group 110, which reflect sensor datasets as detection results of the corresponding sensor group 100, is sequentially accumulated in the vehicle storage device 120. Thus, control datasets indicating changes of a vehicle state, which sequentially changes as a driver drives the vehicle C, is accumulated in the vehicle storage device 120.

To diagnose a fault in the vehicle C, control datasets accumulated in the vehicle storage device 120 are retrieved into a fault diagnosis apparatus 200 that diagnoses the presence or absence of an abnormality in the vehicle C via wire communication or the like.

The fault diagnosis apparatus includes a data input section 210 that retrieves control datasets from a vehicle C to be subject to diagnosis. The fault diagnosis apparatus 200 includes an analytical data storage device 220 that stores, as analytical data to be analyzed by the fault diagnosis apparatus 200, control datasets retrieved by the data input section 210.

Additionally, the fault diagnosis apparatus 200 includes a data analysis section 230 that analyzes control datasets stored in the analytical data storage device 220. The data analysis section 230 according to the present embodiment analyzes control datasets stored in the analytical data storage device 220. Mechanical or control-related abnormalities in the vehicle control system include, for example: communication failure as in a CAN (Control Area Network) connecting vehicle control device groups 110 composing the vehicle C, abnormal feedback in the vehicle control device group 110; or unstable idling. When such abnormalities arise, the time-series changes of control datasets temporarily change based on a specific frequency component. The inventors have confirmed that data fluctuations resulting from such mechanical or control-related abnormalities in the vehicle control system arise in about several milliseconds.

The data analysis section 230 according to the present embodiment includes a computing section 231 by which data fluctuations resulting from mechanical or control-related abnormalities in the vehicle control system are uncovered. The data analysis section 230 also includes a recognizing section 232 that recognizes data that the fault diagnosis apparatus 200 has to subject to diagnosis based on the computation results of the computing section 231.

The computing section 231 has a change amount calculating section 231a that calculates the amount of change per unit time in the control datasets stored in the analytical data storage device 220. The change amount calculating section 231a reads, when necessary, various control datasets stored in the analytical data storage device 220 and calculates the amount of change per unit time in each of the control datasets read. The change amount calculating section 231a outputs information about the amount of change, calculated for each control dataset, to the recognizing section 232. Upon input of information about the amount of change from the change amount calculating section 231a, the recognizing section 232 recognizes, based on the information about the amount of change, control datasets that include any abnormal change in data.

In the vehicle C comprising an automobile or the like, sensor datasets, which are the values detected by the sensor group 100, change as a result of the driver's operation of the vehicle C. For example, change of the sensor datasets of the accelerator sensor changes according to the amount of depression of an accelerator pedal by the driver. Similarly, sensor datasets that are values detected by the steering sensor and yaw rate sensor, change according to the amount of operation of the steering by a driver. The control datasets of the vehicle control device group 110, the amount of control of which is determined based on changes of such sensor datasets, change as a result of changes in sensor datasets, i.e., the driver's operation of the vehicle. Data fluctuations resulting from such human factors arise regardless of the presence or absence of an abnormality of the sensor group 100 or vehicle control device groups 110. Therefore, even if sensor datasets or control datasets temporarily exhibit a peculiar change resulting from an abnormal vehicle operation, such as sudden acceleration or sudden deceleration, this peculiar change does not indicate any actual abnormality of the sensor group 100 or vehicle control device groups 110. Generally, the frequency component of data fluctuation resulting from such human factors is large, and arises in approximately several hundred milliseconds as a minimum. In contrast, data fluctuation resulting from a mechanical or control-related abnormality of the vehicle control device group 110 arises in several milliseconds and therefore a frequency component is very small. Therefore, the amount of change per unit time in data fluctuations resulting from mechanical or control-related abnormalities of the vehicle control device group 110 is large in comparison to the amount of change per unit time in data fluctuations resulting from human factors.

In view of the difference between the amounts of data fluctuation per unit time, as described above, the recognizing section 232 according to the present embodiment uses information about the amount of change, input from a change amount calculating section 231a, and thereby identifies control datasets including data fluctuation resulting from mechanical or control-related abnormalities in the vehicle control device group 110. The recognizing section 232 extracts such identified control datasets from the analytical data storage device 220. Thereafter, the recognizing section 232 determines that the extracted control datasets are the vehicle data to be subject to diagnosis to identify abnormalities in the vehicle C and then outputs the extracted control datasets to an abnormality diagnosis section 240 provided to identify the cause of any abnormalities in the vehicle C based on the control datasets.

In the present embodiment, the vehicle data analysis apparatus comprises the data analysis section 230 that includes the computing section 231 and recognizing section 232, as described above.

The abnormality diagnosis section 240 identifies based on control datasets input from the recognizing section 232 the cause of data fluctuation. Specifically, the abnormality diagnosis section 240 identifies, for example, communication failures such as in CAN, feedback abnormalities in the vehicle control device group 110, or unstable idling, as the causes of data fluctuation.

FIGS. 2 to 5 illustrate the operations of the vehicle data analysis apparatus, vehicle data analysis method, and fault diagnosis apparatus according to the present embodiment.

Figure 2:
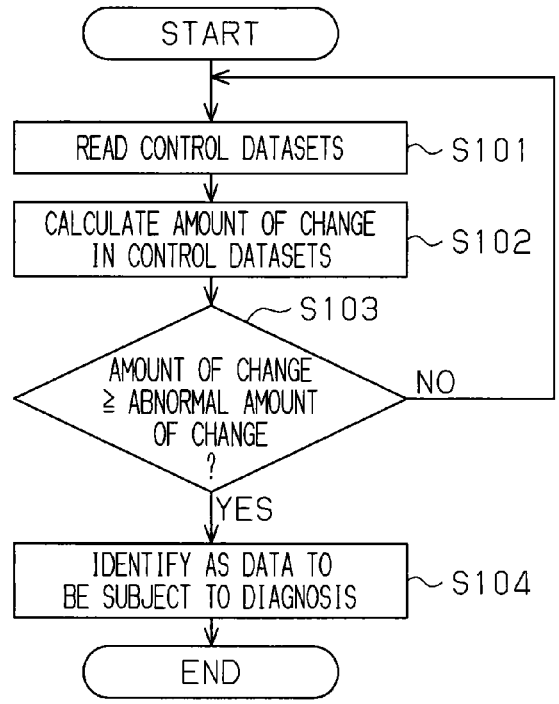
FIG. 2 is a flowchart of an example of a vehicle data analysis procedure and fault diagnosis procedure according to the first embodiment.
Figure 3:
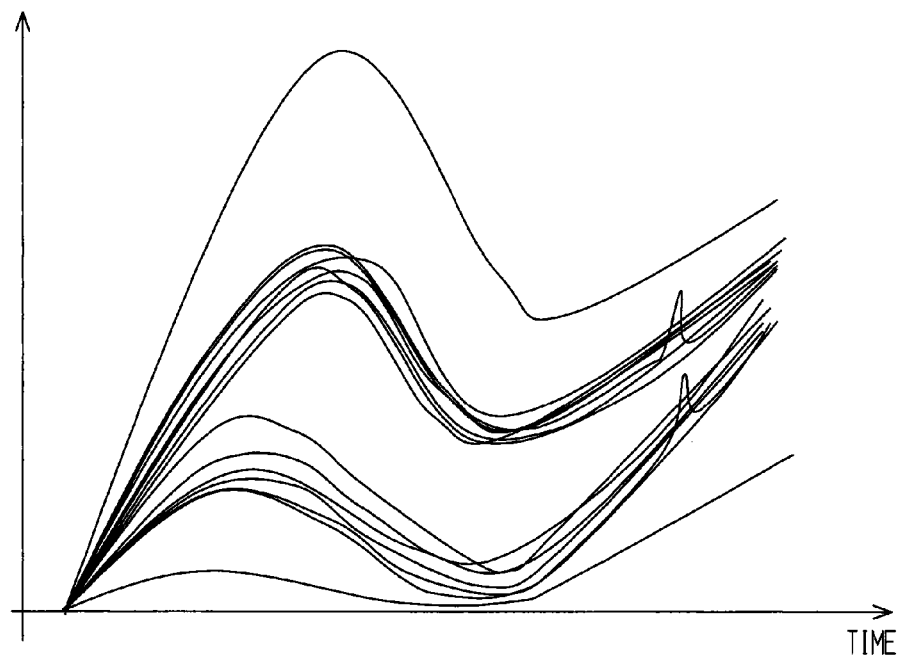
FIG. 3 is a time chart showing examples of changes of the amount of control of an engine control device.
Figure 4:
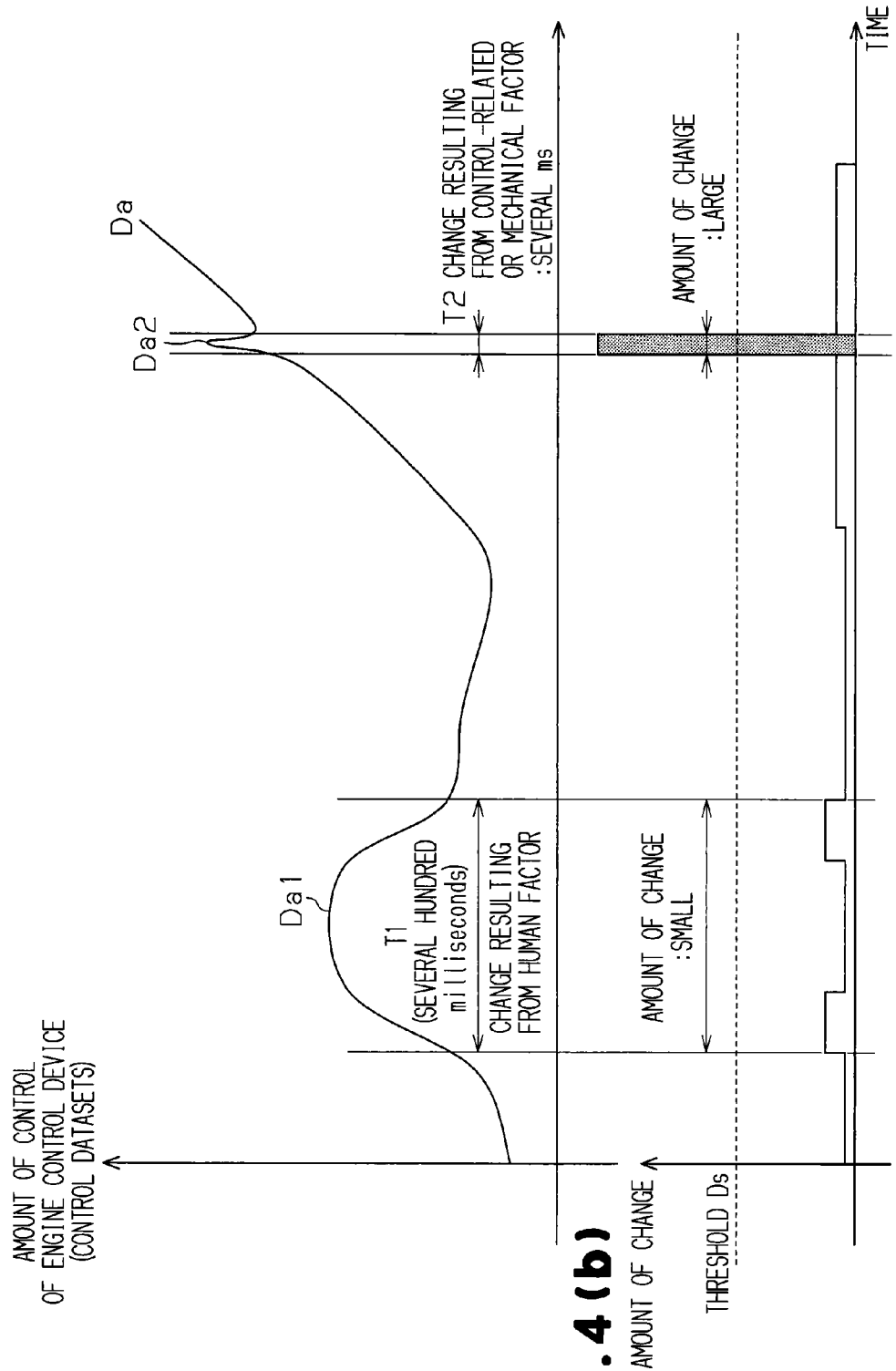
FIG. 4($a$) is a time chart showing an example of changes of one control dataset of the engine control apparatus to be analyzed.

As shown in FIG. 2, first, the data analysis section 230 reads control datasets of the vehicle C to be subject to diagnosis, from the analytical data storage device 220 in step S101. Consequently, for example, control datasets of a plurality of patterns indicating the time-series changes of the control amount of the engine control device after an ignition key is turned to the on-position are read. As shown in FIG. 3, the frequency component of the control amount of the engine control device changes greatly according to the amount of depression of the accelerator by the driver of the vehicle C.

The data analysis section 230 calculates the amount of change per unit time in each of the control datasets read (Step 102 in FIG. 2). As shown in FIG. 4(a) as an example, change of a certain control dataset Da includes: a data fluctuation Da1 (period T1) having a large frequency component that has arisen as a result of accelerator operation by the driver of the vehicle C; and a data fluctuation Da2 (period 2) having a small frequency component that has arisen due to operation failure of the engine control device. In terms of frequency component, whereas the change period T1 of a control dataset resulting from a human factor is several hundred milliseconds, the change period T2 of the control dataset resulting from operation failure of the engine control device is several milliseconds. Specifically, the data fluctuation Da2 resulting from a mechanical or control-related abnormality arises in a time width approximately two orders of magnitude smaller than the data fluctuation Da1 resulting from a human factor.

Therefore, as shown in, for example, FIG. 4(b), the amount of change per unit time in control dataset Da differs greatly according to whether the change is caused by a human or a mechanical or control-related factor in a vehicle control system. Therefore, the recognizing section 232 recognizes a factor in a data fluctuation by determining whether the respective amounts of data fluctuations Da1 and Da2 of the control dataset Da per unit time are equal to or higher than a threshold value Ds used to determine whether a data fluctuation in control datasets to be analyzed results from a human or a mechanical or control-related factor (step S103 in FIG. 2).

As is apparent from FIG. 4(b), the control dataset Da includes the data fluctuation Da2 equal to or greater than the threshold value Ds in the period T2. Therefore, the control dataset Da is identified as a dataset reflecting operation failure or the like in, for example, the engine control device (YES in step S104, and S104). That is, this identified control dataset Da is determined by the data analysis section 230 as a dataset to be analyzed by an abnormality diagnosis section 240 among control dataset types stored in the analytical data storage device 220 as shown in FIG. 3 described above.

On the other hand, when the control datasets do not include any data fluctuations equal to or greater than the threshold value Ds, a determination is made that the engine control device serving as an output source for the control datasets, and the system and so on that operate in cooperation with the engine control device, are normal. Therefore, the control datasets are not used for fault diagnosis of the vehicle C (NO in step S103).

Thus, control datasets actually to be subject to diagnosis by the abnormality diagnosis section 240, that is, only the control datasets including data fluctuations resulting from control-related or mechanical factors in the vehicle control system are retrieved by the abnormality diagnosis section 240. Accordingly, this section 240 is able to diagnose an abnormality based on control datasets reflecting mechanical or control-related abnormalities in the vehicle control system. Therefore, control datasets including only data fluctuations resulting from human factors are prevented from being retrieved by the abnormality diagnosis section 240, thus improving accuracy in identifying control datasets reflecting mechanical or control-related abnormalities in the vehicle control system. To identify such control datasets, the fault diagnosis apparatus 200 simply determines the amount of change in control datasets per unit time. Also, the need to use data models or the like captured in advance when the vehicle control device groups 110 are normal, is eliminated.

Thus, the control datasets stored in the analytical data storage device 220 are read, the amount of change per unit time in the control datasets read is calculated, a comparison between the calculated amount of change and an abnormal amount of change, and so on, are carried out, as necessary (steps 101 to S104 in FIG. 2). Thus, the control datasets stored in the analytical data storage device 220 are analyzed as required, and the control datasets including abnormal factors are retrieved by the abnormality diagnosis section 240, as necessary.

Figure 5:
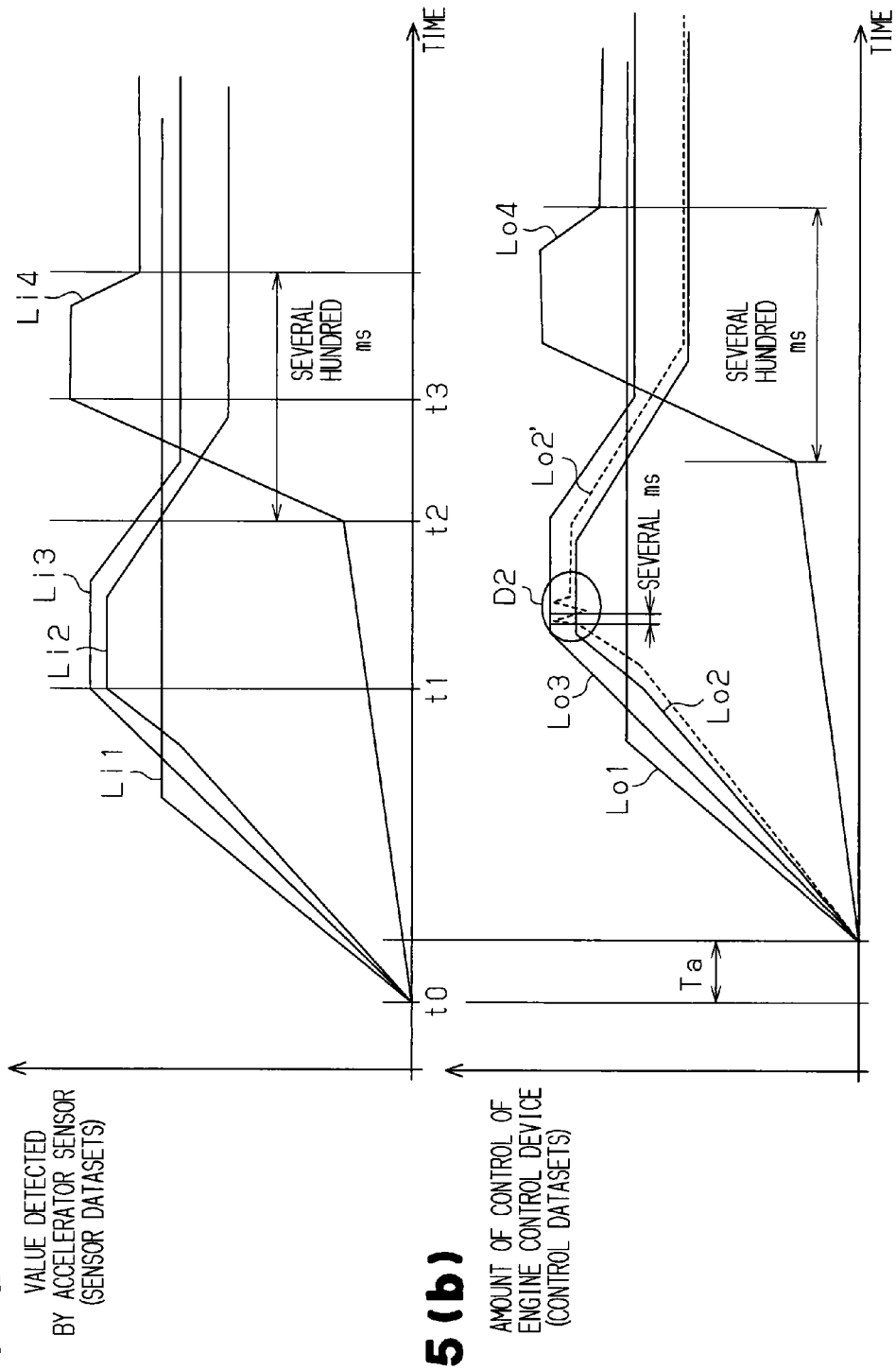
FIG. 5($a$) is a time chart showing examples of changes of a value detected by an accelerator sensor.

Referring to FIG. 5, the characteristics of analyzing vehicle data by the vehicle data analysis apparatus, vehicle data analysis method, and fault diagnosis device according to the present embodiment will now be described in comparison with the characteristics of analyzing the vehicle data by conventional statistical methods.

As shown in FIG. 5(a), sensor datasets Li1 to Li4, which are, for example, the values detected by the accelerator sensor, exhibit respective time-series changes of different patterns. As shown in FIG. 5(b), control datasets Lo1 to Lo4 used as output data of an accelerator control device in which those sensor datasets Li1 to Li4 are input are delayed by a predetermined response time Ta (delay time), and these control datasets change in patterns similar to the respective change patterns of the sensor datasets Li1 to Li4. This response time Ta indicates the time taken for the vehicle C to act in response to a corresponding vehicle control device as a result of depressing operations of the accelerator pedal by the driver of the vehicle C, indicated by the sensor datasets Li1 to Li4.

In the period between time points t0 and t1 in FIG. 5(a), three sensor datasets Li1 to Li3 among the sensor datasets Li1 to Li4 gently change upward in proportion to the usual depressing operations of the accelerator pedal by the driver of the vehicle C. In contrast, change of the sensor dataset Li4 tends to change suddenly from time point t2 to time point t3 as a result of unstable depressing operation of the accelerator pedal by the driver of the vehicle C Therefore, as shown in FIG. 5(b), the control datasets Lo1 to Lo3 corresponding to the sensor datasets Li1 to Li3 gently change upward after being delayed for the response time Ta, as with the sensor datasets Li1 to Li3. The control dataset Lo4 corresponding to the sensor dataset Li4 change suddenly at a certain point during the period after being delayed for the response time Ta, as with the sensor dataset Li4.

If control datasets including the control datasets Lo1 to Lo3 that exhibit average changes with patterns similar to one another and the control dataset Lo4 that exhibits a peculiar change are analyzed by using an existing statistical method, the control dataset Lo4 that exhibits a peculiar change among the control datasets Lo1 to Lo4 is identified as a dataset that includes an abnormal data fluctuation. Meanwhile, as indicated by a broken line in FIG. 5(b), even if the control dataset Lo2', which includes a data fluctuation D2 resulting from a mechanical or control-related abnormality in the vehicle control system, is present, the control dataset Lo2' including the abnormal factor may be regarded as a normal dataset since change of the control dataset Lo2' and changes of the control datasets Lo1 to Lo3 are nearly homogeneous.

However, in the present embodiment, even if the control dataset Lo4, exhibiting a peculiar change in control dataset statistics as a result of, for example, unstable depression of the accelerator pedal, is present, the amount of change per unit time in data fluctuation resulting from this human factor eventually becomes smaller than a threshold Ds. Accordingly, the control dataset Lo4 is prevented from being erroneously determined as a vehicle dataset that includes an abnormal factor. In the present embodiment, the control dataset Lo2' including the abnormal factor reaches the threshold value Ds or above in terms of the amount of data fluctuation D2 per unit time. Therefore, the control dataset Lo2' is precisely identified as a vehicle dataset that includes an abnormal factor and is subject to fault diagnosis for the vehicle C.

As described above, according to the vehicle data analysis apparatus, vehicle data analysis method, and fault diagnosis apparatus according to the present embodiment, the advantages described below are obtained.

(1) Calculations for uncovering a data fluctuation resulting from a mechanical or control-related abnormality in the vehicle control system, which is included in a vehicle data, are carried out. Also, based on the result of this calculation, any vehicle data to be subject to diagnosis for an abnormality in the vehicle C are recognized when abnormality in the vehicle C is diagnosed. Accordingly, any vehicle data including data fluctuations resulting from mechanical or control-related abnormalities in a vehicle control system can be precisely recognized from among various vehicle data captured from the vehicle C. Accordingly, the vehicle data to be subject to diagnosis can be identified with high precision. This eliminates the need to use a data model in order to identify a vehicle dataset that includes an abnormal factor. Even in a case where the vehicle data reflecting various running states, running environments or the like of the vehicle C exhibit any changes, a vehicle dataset including an abnormal factor can be identified without establishing the pattern of change of this vehicle dataset in advance.

(2) As data reflecting the characteristics of the driver's operations of the vehicle C, the present embodiment makes use of: sensor datasets indicating changes of the values detected by the sensor group 100 provided to detect the state of a vehicle C; and the vehicle data that includes the respective control datasets of the vehicle control device groups 110 reflecting changes of the corresponding sensor datasets. Based on the results of calculation by the computing section 231, a vehicle dataset including a data fluctuation based on a factor different from the driver's operation of the vehicle C is identified as a diagnosis target. Therefore, even if a data fluctuation resulting from the driver's abnormal operation of the vehicle is included in a sensor dataset or control dataset, the vehicle dataset including the data fluctuation resulting from a human factor is prevented from being erroneously identified as a vehicle data to be subject to diagnosis by an abnormality diagnosis section 240. Accordingly, although the vehicle dataset reflecting the driver's operation of the vehicle significantly is to be subject to diagnosis, the diagnosis target can be identified precisely.

(3) As computation by the computing section 231, the amount of change per unit time in control datasets is calculated and a control dataset that includes a data fluctuation resulting from the mechanical or control-related abnormality in the vehicle control system is identified based on the calculated amount of change. Accordingly, a vehicle dataset including a data fluctuation resulting from a mechanical or control-related abnormality in the vehicle control system can be identified from the amount of data fluctuation per unit time, included in the control dataset.

(4) Based on the vehicle data analyzed by the data analysis section 230, the presence or absence of abnormality in the vehicle C is diagnosed. Accordingly, the vehicle dataset to be subject to diagnosis can be identified as a vehicle dataset determined by analysis to be highly likely to include an abnormal factor. Consequently, abnormality in the vehicle C can be diagnosed smoothly and highly accurately.

FIGS. 6 to 10 illustrate a second embodiment of a vehicle data analysis apparatus, vehicle data analysis method, and a fault diagnosis apparatus according to the present invention. In this second embodiment, any data fluctuation resulting from a mechanical or control-related abnormality in a vehicle control system, included in a vehicle data, is uncovered through computation used to obtain the statistical distribution of the vehicle data. The basic configuration of the second embodiment is common to that of the first embodiment.

Figure 6:
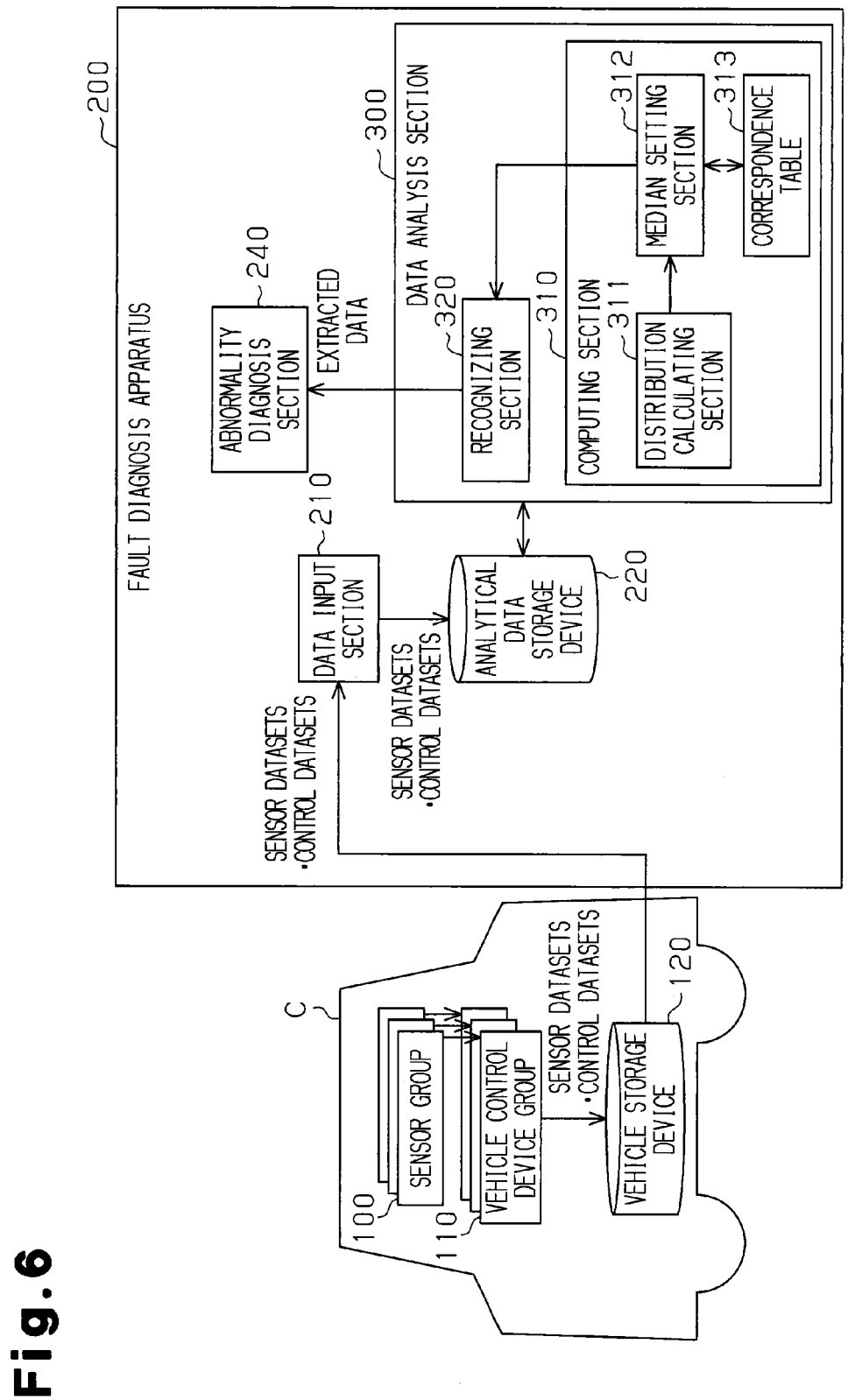
FIG. 6 is a block diagram of a schematic configuration of a vehicle data analysis apparatus and fault diagnosis apparatus in a vehicle data analysis apparatus, vehicle data analysis method, and fault diagnosis apparatus according to a second embodiment of the present invention, and also a block diagram of a schematic configuration of an apparatus in which the vehicle data analysis method according to the present embodiment is applied.

FIG. 6, corresponding to FIG. 1 described above, shows the configuration of the vehicle data analysis apparatus and the fault diagnosis apparatus according to the second embodiment, and an apparatus in which the vehicle data analysis method according to the present invention is applied. In FIG. 6, components identical to those shown in FIG. 1 are labeled with identical symbols and duplicate explanations are omitted.

As shown in FIG. 6, a group of vehicle control devices 110 according to the present embodiment sequentially output the sensor datasets, which indicates the time-series changes of values detected by and input from the corresponding sensor group 100, to a vehicle storage device 120 together with the control datasets for the vehicle control device group 110. Accordingly, accumulated in a vehicle storage device 120 according to the present embodiment are sensor datasets, which are input to the vehicle control device group 110, and control datasets, which are output from the vehicle control device group 110. Thus, control datasets and sensor datasets indicating changes of a vehicle state that sequentially changes according to the driver's operation of the vehicle C are accumulated in the vehicle storage device 120. To subject the vehicle C to a fault diagnosis, the sensor datasets and control datasets accumulated in the vehicle storage device 120 are retrieved, through, for example, wire communication, by the fault diagnosis apparatus 200, which diagnoses the presence or absence of any abnormality in the vehicle C. The result of the diagnosis is stored in an analytical data storage device 220 of the fault diagnosis apparatus 200, as necessary.

The computing section 310 composing the data analysis section 300 according to the present embodiment includes a distribution calculating section 311 that carries out computation to obtain the statistical distribution of various sensor datasets stored in the analytical data storage device 220. The computing section 310 according to the present embodiment includes a median selecting section 312 that, based on the statistical distribution calculated by the distribution calculating section 311, extracts a sensor dataset group located around the median from the analytical data storage device 220. Additionally, the distribution calculating section 311 includes a correspondence table 313 already representing the correspondence between sensor datasets and control datasets highly correlated with the sensor datasets.

In the computing section, the distribution calculating section 311 extracts various sensor datasets from the analytical data storage device 220 as input data for the vehicle control device groups 110. The distribution calculating section 311 obtains the statistical distribution of each of the extracted sensor datasets. The distribution calculating section 311 according to the present embodiment obtains, for example, a normal distribution of each sensor dataset as the statistical distribution of each sensor dataset. For example, for each of the various sensors that detect sensor datasets, the distribution calculating section 311 extracts sensor datasets and also obtains a normal distribution of the extracted sensor dataset for each type of sensor. Upon calculating a normal distribution of the sensor datasets for each type of sensor, the distribution calculating section 311 outputs information about the obtained normal distribution of each type of sensor to the median selecting section 312.

Based on the information about the normal distribution of each type of sensor input from the distribution calculating section 311, the median selecting section 312 selects sensor dataset groups located around the median in the normal distribution. Therefore, the normal distribution of each sensor dataset stored in the analytical data storage device 220 is calculated for each type of sensor that detects a corresponding dataset. Thereby, a sensor dataset group exhibiting an average change that exhibits relatively high probability density in this calculated distribution is selected. As described above, in the present embodiment, a sensor dataset that exhibits an average change is selected in advance from the sensor datasets stored in the analytical data storage device 220. Thereby, a sensor dataset that varies significantly as a result of abnormal vehicle operations such as sudden acceleration or sudden deceleration by the driver of the vehicle C is excluded from analytical targets.

Upon obtaining information about the selected sensor dataset group, the median selecting section 312 identifies a control dataset corresponding to a selected sensor dataset, by referring to the correspondence table 313.

Figures 7, 8:
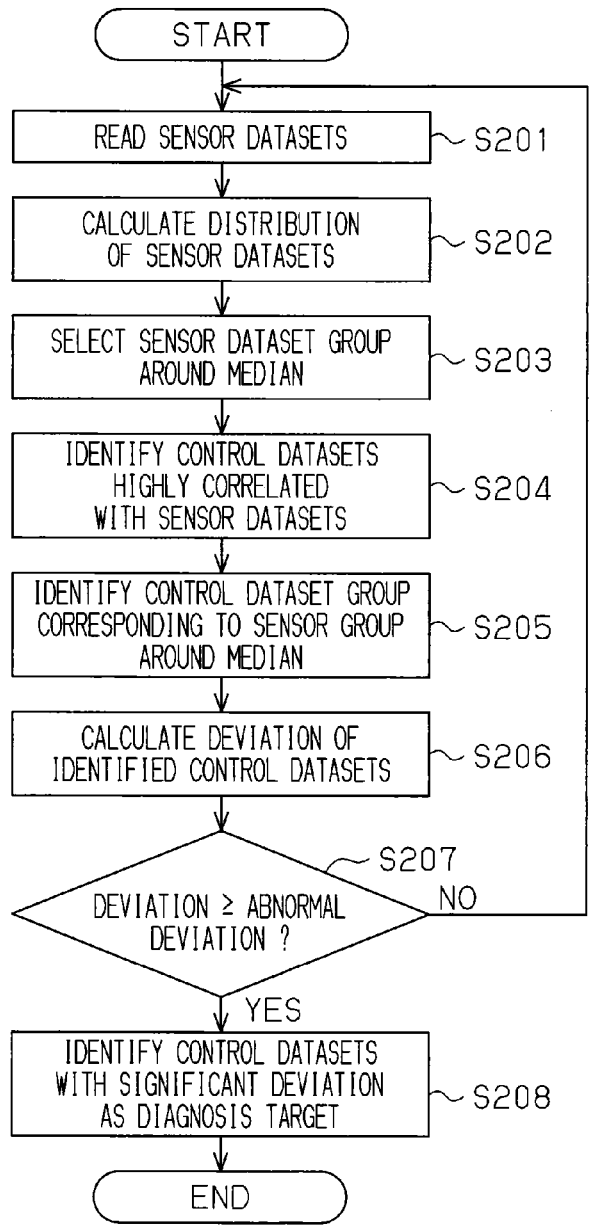
FIG. 7 shows an example of the relationships between sensor datasets and control datasets registered in a correspondence table.
FIG. 8 is a flowchart showing an example of a vehicle data analysis procedure and fault diagnosis procedure according to the second embodiment.

As shown in FIG. 7, namely, in the correspondence table 313, various sensor datasets detectable by the sensor group 100 and control datasets that will be data output from the vehicle control device groups 110, into which various sensor datasets are input, are related to each other. According to the present embodiment, in the correspondence table 313, for example, the sensor datasets indicating changes of the value detected by an accelerator sensor, and control datasets indicating changes of the amount of control of the engine control device reflecting changes of the sensor datasets after the input thereof, are shown to correspond in advance. Additionally, in the correspondence table 313, for example, sensor datasets indicating changes of a value detected by the steering sensor, and control datasets indicating changes of the control amount of a VSC control device reflecting changes of the sensor datasets after the input thereof, are shown to correspond to each other.

By referring to such a correspondence table 313, the median selecting section 312 according to the present embodiment identifies control datasets that have high correlations with sensor datasets located around the median of the selected normal distribution described above. The median selecting section 312 determines that, among the identified control datasets, a control dataset exceeding, for example, 500 milliseconds or so in terms of the delay time of the control dataset with respect to the corresponding sensor dataset is not a control dataset that has responded to the sensor dataset. Therefore, the median selecting section 312 excludes this control dataset from the identified control datasets described above. When a sensor dataset and a corresponding control dataset are not registered in the correspondence table 313, the median selecting section 312 retrieves a control dataset that is similar in time-series change to a sensor dataset and that is within, for example, 500 milliseconds or so in terms of the delay time with respect to the sensor datasets is retrieved from the analytical data storage device 220. The median selecting section 312 identifies the retrieved control datasets, as control datasets that have high correlations with sensor datasets located around the median of the selected normal distribution described above. Consequently, the computing section 310 receives an input of a sensor dataset detected by each sensor and identifies control datasets for a vehicle control device in which each type of control based on the input sensor dataset is exerted. The median selecting section 312 outputs information about these identified control datasets to a recognizing section 320.

The recognizing section 320 according to the present embodiment identifies control datasets that have large deviation among the control datasets identified by the median selecting section 312. The control datasets identified by the median selecting section 312 are sensor datasets with high probability densities, which is located around the median in the normal distribution. In other words, the control datasets are data from which variations resulting from the driver's abnormal operation of the vehicle are excluded. Therefore, it is highly probable that the deviation arising in the control datasets identified by the median selecting section 312 may have arisen due to factors different from the driver's operation of the vehicle C. Hence, the recognizing section 320 according to the present embodiment identifies a control dataset that has a significant deviation among the identified control datasets, as a control dataset that includes a deviation resulting from an abnormality other than a human factor, that is, a mechanical or control-related abnormality in a vehicle control system. The recognizing section 320 extracts the identified control dataset from the analytical data storage device 220, and outputs this extracted control dataset to an abnormality diagnosis section 240. Thus, based on the control dataset input from the recognizing section 320, the abnormality diagnosis section 240 identifies the cause of the deviation in the control dataset.

In the present embodiment, the vehicle data analysis apparatus is composed of the data analysis section 300 that includes the computing section 310 and recognizing section 320 described above.

FIGS. 8 to 10 illustrate the operation of the vehicle data analysis apparatus, vehicle data analysis method, and fault diagnosis apparatus according to the present embodiment.

Figure 9A:
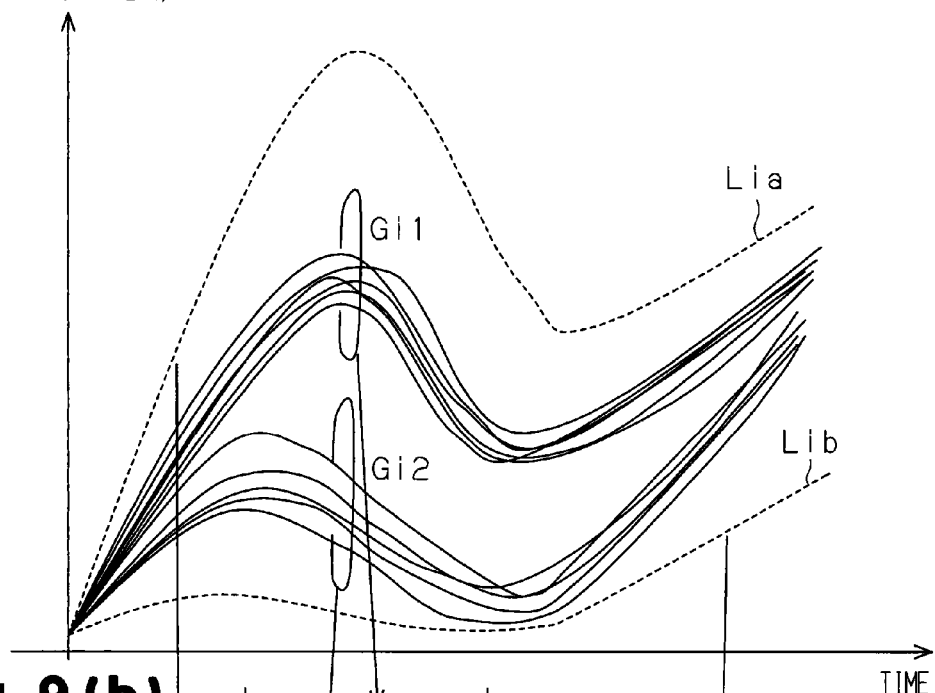
FIG. 9($a$) is a time chart showing examples of changes of a value detected by an accelerator sensor.

As shown in FIG. 8, first, the data analysis section 300 reads sensor datasets of the vehicle C to be subject to diagnosis, from the analytical data storage device 220 in step S201. Such sensor datasets are read, for example, by each sensor that detects the sensor datasets. Consequently, for example, sensor datasets for a plurality of patterns indicating the time series changes of the value detected by the accelerator sensor after an ignition key is turned to the on-position are read from the analytical data storage device 220, as shown in FIG. 9(a) as an example. As shown in FIG. 9(a), the frequency component of the value detected by the accelerator sensor changes greatly according to the amount of depression of the accelerator by the driver of the vehicle C.

The data analysis section 300 calculates the distribution of the read sensor datasets for each sensor that detects the sensor datasets (step S202: FIG. 8). As a result, as shown in FIG. 9(b) as an example, a normal distribution of a sensor dataset group captured by, for example, an accelerator sensor can be obtained.

In this embodiment, as shown in FIG. 9(a), changes of the amount of depression of the accelerator pedal by the driver of a certain vehicle C tend to be divided into roughly two groups Gi1 and Gi2. Sensor datasets included in these groups Gi1 and Gi2 indicate that they exhibit the average change of the amount of depression of the accelerator pedal by the driver of the vehicle C. In contrast, changes of the sensor datasets Lia and Lib that are not included in the groups Gi1 and Gi2 indicate that the amounts of depression of the accelerator pedal are excessive or insufficient. As shown in FIG. 9(b), sensor dataset groups included in the groups Gi1 and Gi2 are located around the median of the normal distribution of the sensor datasets that exhibits such changes. That is, the sensor dataset groups located around the median of the normal distribution indicate that, among sensor datasets captured by the vehicle C, these groups have average sensor datasets that exhibit almost the same changes (patterns).

Figure 9B:
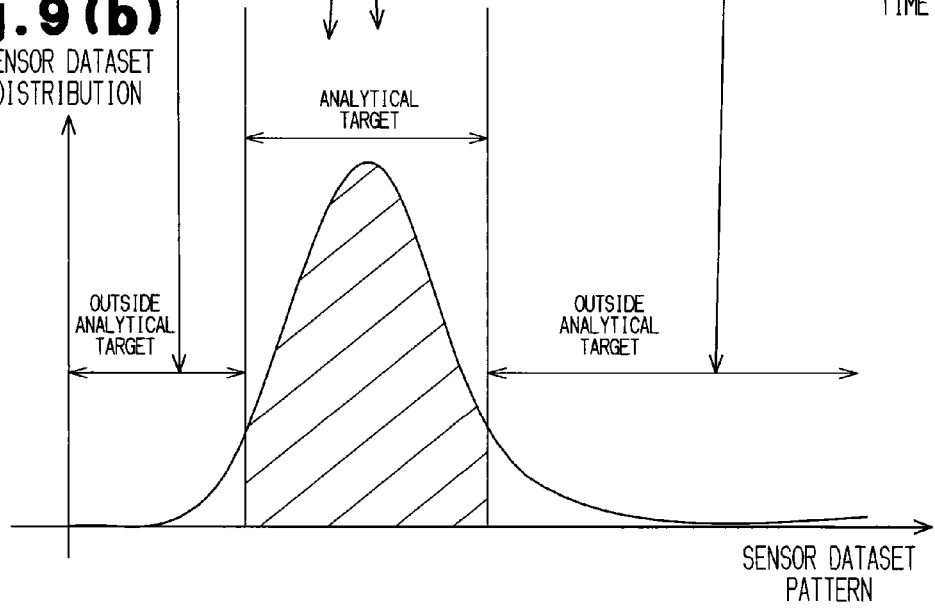

In contrast, as shown in FIG. 9(b), changes of sensor datasets Lia and Lib that are not included in these groups Gi1 and Gi2 result in peculiar patterns in the normal distribution, that is, sensor datasets the deviations of which are significant as a result of the driver's unstable operation of the vehicle. In that way, groups Gi1 and Gi2 roughly identical in frequency component are identified from among sensor datasets stored in the analytical data storage device 220.

As shown in FIG. 8, in the present embodiment, the sensor dataset groups located around the median of the normal distribution are selected as data that does not include an abnormal value resulting from the driver's operation of the vehicle C (step S203). Subsequently, control datasets corresponding to these selected sensor datasets, that is, control datasets for the vehicle control device, the amount of control of which are determined based on the sensor datasets after these sensor datasets are input, are identified by referring to the correspondence table 313 described above (step S204). Among these identified control datasets, any control datasets the delay time of which exceeds several hundred milliseconds with respect to the corresponding sensor datasets are determined not to be control datasets that correspond to the sensor datasets. Furthermore, these control datasets are excluded from the identified control datasets. Similarly, control datasets that have no delay time with respect to corresponding sensor datasets are excluded from the identified control datasets. Alternatively, if a corresponding sensor dataset and control dataset are not registered in the correspondence table 313, control datasets similar to sensor datasets in time-series change and falling within several hundred milliseconds in terms of delay time with respect to the sensor datasets are identified.

Thus, as shown in FIG. 10, control datasets are identified that exhibit changes of the amount of control of the engine control device determined based on, for example, a value detected by an accelerator sensor. Changes of these control datasets are correlated with changes of the values detected by the accelerator sensor, shown in FIG. 9(a), and are delayed within, for example, 500 milliseconds or so, which is a constant response time Ta.

For example, as shown by the solid lines in FIG. 10, the control datasets corresponding to the sensor datasets exhibiting changes of values detected by the accelerator sensor, respectively have groups Go1 and Go2 corresponding to the groups Gi1 and Gi1 of the accelerator sensor serving as input source. Therefore, the control datasets groups included in these groups Go1 and Go2 are identified as data corresponding to sensor datasets located around the median of the distribution shown in FIG. 9(b) described above (step S205 in FIG. 8).

In the subsequent step S206, the respective deviations of the control datasets included in the identified groups Go1 and Go2 are obtained. Next, a determination is made whether the respective deviations of the control datasets are equal to or greater than an abnormal deviation threshold value or not, the abnormal deviation threshold value indicating an abnormal deviation used to determine whether control dataset groups included in the groups Go1 and Go2 are abnormal or not (step S207). Specifically, a determination is made whether the control dataset groups identified from the determination that roughly most of the frequency components are common to one another, include frequency components based on an factor different from a human factor, that is, control datasets that deviate significantly as a result of including a data fluctuation resulting from a mechanical or control-related abnormality in a vehicle control system.

Consequently, as shown in FIG. 10 as an example, two data fluctuations De1 and De2 resulting from a mechanical or control-related abnormality in the vehicle control system are identified as control datasets the deviations of which are significant in the corresponding control dataset groups included in the groups Go1 and Go2. As shown in FIG. 8, the two control datasets including these data fluctuations De1 and De2 are identified by the recognizing section 320, as data to be subject to diagnosis by the abnormality diagnosis section 240 (step S207, YES in S208).

In contrast, when a determination is made in step S207 that no control datasets having deviations equal to or greater than the abnormality deviation threshold value are present, steps such as reading sensor datasets based on a sensor of another type, calculating a normal distribution, identifying a sensor dataset group located around the median, identifying corresponding control datasets, or calculating the deviation of the identified control datasets are carried out as necessary (Step S207, NO in S201 to S208). Thus, various sensor datasets stored in the analytical data storage device 220 and various control datasets corresponding to the various sensor datasets are analyzed, and control datasets to be subject to diagnosis are identified from the result of this analysis.

As described above, in the vehicle data analysis apparatus, vehicle data analysis method, and fault diagnosis apparatus according to the present embodiment, advantages similar to the advantages (1), (2), and (4) described above are obtained, and, instead of the advantage (3), the advantage described below is obtained.

(1A) The computing section 310 performs computation to obtain the normal distribution of the vehicle data stored in the analytical data storage device 220. The recognizing section 320 recognizes the vehicle data located around the median of the normal distribution and then extracts the vehicle data that has relatively significant deviations among the recognized vehicle data from the analytical data storage device 220. Therefore, in identifying the vehicle data to be subject to diagnosis through statistical analysis of the vehicle data, deviation calculation targets can be limited to the vehicle data groups from which peculiar vehicle data resulting from the driver's peculiar operation of the vehicle are excluded. Accordingly, the degree of influence of each data fluctuation resulting from a mechanical or control-related abnormality in a vehicle control system can be increased on each of the vehicle data groups that are deviation calculation targets. As a result, such a data fluctuation can be precisely reflected in the deviation of the vehicle data. Accordingly, the vehicle data to be subject to diagnosis can be precisely identified through the calculation of vehicle data deviation.

(2A) The calculation targets in a normal distribution are sensor datasets in the vehicle data. Control dataset groups corresponding to sensor groups located near the median of the normal distribution of the sensor datasets are identified, and control datasets to be subject to diagnosis are identified from these corresponding identified control groups. Accordingly, based on the sensor datasets directly reflecting the driver's operation of the vehicle C, control datasets that are deviation calculation targets can be limited.

(3A) A correlation between the sensor datasets and the control datasets is determined based on whether the delay time of the control datasets with respect to the sensor datasets is within several hundred milliseconds or not. Accordingly, using a specific delay time arising between the sensor datasets and control datasets, which respectively exhibit time-series changes, makes it possible not only to check the correlation between these data, but also to verify the correlation.

(4A) The data analysis section 300 is provided with a correspondence table 313 representing the correspondence between sensor datasets and control datasets highly correlated with the sensor datasets. Referring to this correspondence table 313, sensor datasets and control datasets highly correlated with each other are identified. Accordingly, simply by referring to the correspondence table 313, sensor datasets and control datasets highly correlated with each other can be identified easily, thus reducing load on the identifying process.

(5A) As the registration contents of the correspondence table 313, sensor datasets exhibiting changes of the value detected by an accelerator sensor, and control datasets exhibiting changes of the amount of control of the engine control device reflecting changes of the sensor datasets are defined. Similarly, as the registration contents of the correspondence table 313, sensor datasets exhibiting changes of the detection value of a steering sensor and control datasets exhibiting changes of the control amount of a VSC control device reflecting the sensor datasets are restricted. Accordingly, the vehicle data highly correlated with each other and also important as diagnosis targets for vehicle fault analysis can be made to correspond to each other smoothly and precisely.

FIGS. 11 to 13 illustrate a third embodiment of a vehicle data analysis apparatus, vehicle data analysis method, and a fault diagnosis apparatus according to the present invention. In this third embodiment, a data fluctuation resulting from a mechanical or control-related abnormality in a vehicle control system included in the vehicle data is uncovered through computation used to obtain the difference between sensor datasets and control datasets correlated with the sensor datasets. The basic configuration of the third embodiment is common to that of the first embodiment.

FIG. 11, corresponding to FIG. 1 described above, shows the configuration of the vehicle data analysis apparatus and the fault diagnosis apparatus according to the third embodiment. In FIG. 11, components identical to those shown in FIG. 1 are labeled with the identical symbols and the duplicated explanations are omitted.

As shown in FIG. 11, a group of vehicle control devices 110 according to the present embodiment sequentially outputs the sensor datasets, which indicate the time-series changes of values detected by and input from the corresponding sensor groups 100, to a vehicle storage device 120 together with the control datasets of the vehicle control device group 110. Accordingly, accumulated in a vehicle storage device 120 according to the present embodiment are sensor datasets, which are input to the vehicle control device group 110, and control datasets, which are output from the vehicle control device group 110. Thus, control datasets and sensor datasets indicating changes of a vehicle state that sequentially changes according to the driver's operation of the vehicle C are accumulated in the vehicle storage device 120. To subject the vehicle C to a fault diagnosis, the sensor datasets and control datasets accumulated in the vehicle storage device 120 are retrieved, through, for example, wire communication, by the fault diagnosis apparatus 200, which diagnoses the presence or absence of an abnormality in the vehicle C. The result of the diagnosis is stored in an analytical data storage device 220 of the fault diagnosis apparatus 200, as necessary.

As shown in FIG. 11, a computing section 410 composing a data analysis section 400 according to the present embodiment includes a correlated data associating section 411 that associates sensor datasets stored in the analytical data storage device 220 with control datasets correlated with the sensor datasets. A computing section 410 has a correspondence table 412 in which sensor datasets and control datasets highly correlated with each other are registered in advance so as to show their correspondence. Additionally, the computing section 410 includes a sensor dataset frequency analysis section 413 that subjects sensor datasets associated by the correlated data associating section 411, to frequency analysis (FFT); and control dataset frequency analysis section 414 that subjects control datasets associated by the correlated data associating section 411, to frequency analysis. Additionally, the computing section 410 includes a difference calculating section 415 that calculates the difference between the sensor datasets and the control datasets corresponding to the sensor datasets, which have been subjected to frequency analysis by the sensor dataset frequency analysis section 413 and by control dataset frequency analysis section 414, respectively.

In the computing section, the correlated data associating section 411 extracts a sensor dataset obtained by a certain sensor, from the analytical data storage device 220 as a dataset input to a vehicle control device group 110. The correlated data associating section 411 identifies a control dataset highly correlated with the one extracted sensor dataset, and extracts the identified control dataset from the analytical data storage device 220. When the corresponding sensor dataset and control dataset are not registered in the correspondence table 412, the correlated data associating section 411 identifies a control dataset that is similar in time-series change to the one sensor dataset and that is within, for example, 500 milliseconds or so in terms of the delay time with respect to the sensor dataset as a control dataset highly correlated with the sensor dataset.

The correlated data associating section 411 outputs a sensor dataset and a control dataset that are extracted from the analytical data storage device 220 and highly correlated with each other to the sensor dataset frequency analysis section 413 and the control dataset frequency analysis section 414, respectively. With regard to the extraction of such sensor datasets and control datasets, if the number of sensor datasets for the accelerator sensor stored in the analytical data storage device 220 is fifty, the sensor datasets and control datasets corresponding to the sensor datasets are sequentially extracted in pairs. After all the sensor datasets for the accelerator sensor are extracted, for example, a brake sensor dataset group and control datasets corresponding to the sensor dataset group are sequentially extracted. In this manner, all the sensor datasets and control datasets stored in the analytical data storage device 220 are sequentially extracted according to a sensor type, or sensor datasets of a detector, sequentially associated with each other, and sequentially output to the sensor dataset frequency analysis section 413 and the control dataset frequency analysis section 414, respectively.

The sensor dataset frequency analysis section 413 and the control dataset frequency analysis section 414 subject sequentially input sensor datasets and control datasets to frequency analysis. Then, they sequentially output the sensor datasets and control datasets subjected to the frequency analysis, to the difference calculating section 415.

Upon obtaining each sensor dataset and control dataset subjected to frequency analysis corresponding to each other from the sensor dataset frequency analysis section 413 and control dataset frequency analysis section 414, respectively, the difference calculating section 415 calculates the difference between the sensor datasets and control datasets obtained. The difference calculating section 415 outputs information about the calculated difference to the recognizing section 420.

From items of information about the respective differences between the sensor datasets and corresponding control datasets, obtained from the difference calculating section 415, the recognizing section 420 recognizes sensor datasets and corresponding control datasets the respective differences between which are equal to 0 or recognizes sensor datasets and corresponding control datasets the respective differences between which are greater than a predetermined threshold value. Specifically, the respective differences between the sensor datasets and corresponding control datasets, calculated by the difference calculating section 415, are datasets in which portions similar to the sensor datasets are excluded from the control datasets, in other words, data from which any changes based on the driver's operation of the vehicle C are excluded. Therefore, in the recognizing section 420 according to the present embodiment, when the difference between a sensor dataset and the corresponding control dataset is equal to or greater than 0 or greater than the predetermined threshold value, the recognizing section 420 recognizes that a data fluctuation resulting from a factor different from the driver's operation of the vehicle C is included in the control datasets. That is, when there is the difference between a sensor dataset and the corresponding control dataset, the recognizing section 420 recognizes that the control dataset includes a change resulting from a mechanical or control-related abnormality in the vehicle control system and hence this control dataset is useful to diagnose a fault in the vehicle C. In contrast, when there is no difference between a sensor dataset and the corresponding control dataset, the recognizing section 420 recognizes that the control dataset does not include any data fluctuations resulting from mechanical or control-related abnormality in the vehicle control system.

The recognizing section 420 extracts from the analytical data storage device 220 a control dataset recognized to include a mechanical or control-related abnormality in the vehicle control system. Also, the recognizing section outputs this extracted control dataset to the abnormality diagnosis section 240. Based on the control dataset input from the recognizing section 420, the abnormality diagnosis section 240 identifies the cause of the difference between this control dataset and the sensor dataset.

In the present embodiment, the vehicle data analysis apparatus is composed of the data analysis section 400 that includes the computing section 410 and recognizing section 420 described above.

FIGS. 12 to 13 illustrate the operation of the vehicle data analysis apparatus, vehicle data analysis method, and fault diagnosis apparatus according to the present embodiment.

As shown in FIG. 12, first, the data analysis section 400 reads from the analytical data storage device 220 the sensor datasets of the vehicle C to be subject to diagnosis in step S301. The data analysis section 400 identifies control datasets corresponding to the read sensor datasets, as necessary, and reads the identified control datasets from the analytical data storage device 220 (step S302). Thus, control datasets corresponding to sensor datasets for, for example, the accelerator sensor, are read from the analytical data storage device 220, as necessary.

Consequently, for example, as shown in FIG. 13(a), control dataset groups of a plurality of patterns, which exhibit the time-series changes of the amount of control of the engine control device, are read, for example, as control datasets corresponding to the sensor datasets for the accelerator sensor after the ignition key is turned to the on-position. In this embodiment, as indicated by a period T1, two control datasets in the corresponding control dataset groups read from the analytical data storage device 220 include data fluctuations De1 and De2, respectively, resulting from operation failure in the engine control device.

As shown in FIG. 12, the data analysis section 400 subjects the read sensor datasets and control datasets corresponding to the sensor datasets to frequency analysis, and finds the differences between the sensor datasets and the control datasets corresponding to the sensor datasets, both of which have been subjected to frequency analysis, (step S303). Thus, for example, as shown in FIG. 13(b), the differences between the sensor datasets and the control datasets corresponding to the sensor datasets, subjected to frequency analysis, are obtained, as necessary.

Next, in the subsequent step S305, a control dataset that is not equal to 0 as the result of the calculation of the difference in value between this control dataset and a corresponding sensor dataset, or a control dataset that exceeds a predetermined threshold value as the result of the calculation of the difference in value between this control dataset and a corresponding sensor dataset, is identified from the difference between the sensor datasets and control datasets, both of which have been subjected to frequency analysis. Specifically, in the example as shown in FIG. 13(b) described above, the differences in value between most of the sensor datasets and the corresponding control datasets are set as values approximate to 0. However, as indicated by the period T1, the differences in value Df1 and Df2 between the control datasets including the data fluctuations De1 and De2 respectively and the sensor datasets corresponding to the control datasets are significantly greater than 0.

Therefore, as shown in FIG. 12, the data analysis section 400 identifies, as data to be subject to diagnosis by the abnormality diagnosis section 240, the two control datasets from which these differences in value Df1 and Df2 are calculated, that is, the two control datasets that respectively include the data fluctuations De1 and De2 resulting from, for example, operation failure in the engine control device (step S305). When there is no difference between a sensor dataset and a corresponding control dataset, a sensor dataset of the next type (i.e., different type) and a control dataset are associated with each other and they are subjected to frequency analysis, and the calculation of the difference between these data, and so on, as necessary (steps S301 to S305).

Thus, the sensor datasets and control datasets stored in the analytical data storage device 220 are analyzed, as necessary, and a control dataset including a data fluctuation resulting from a mechanical or control-related abnormality in the vehicle control system is output to the abnormality diagnosis section 240, also as necessary.

As described above, according to the vehicle data analysis apparatus, vehicle data analysis method, and fault diagnosis apparatus according to the present embodiment, advantages similar to the advantages (1), (2), (4), (3A) to (5A) stated above are obtained. Also, instead of the advantages (3), (1A), and (2A) stated above, the advantages described below are obtained.

(1B) As a computation to uncover any data fluctuation resulting from a mechanical or control-related abnormality in the vehicle control system, the difference between the sensor dataset and the control dataset is calculated. Accordingly, by using the sensor dataset, a data fluctuation resulting from a human factor, which is included in the control dataset, can be excluded, thus making it possible to easily identify a vehicle dataset actually to be subject to diagnosis.

(2B) The difference between a sensor dataset and control dataset corresponding to the sensor dataset is calculated based on the sensor dataset subjected to frequency analysis and control dataset subjected to frequency analysis. Accordingly, a data fluctuation resulting from a mechanical or control-related abnormality in a vehicle control system can be uncovered easily and precisely.

Each of the embodiments described above may be modified as follows.

In the second and third embodiments, the correlation between a sensor dataset and control dataset are determined based on whether delay time of the control dataset with respect to the sensor dataset is about several hundred milliseconds, for example, 500 milliseconds or so. The invention is not limited to this, and delay time for determining the correlation of the control dataset with the sensor dataset may be a time based on the response time of a vehicle's behavior with respect to the driver's operation of the vehicle C, which is indicated by the sensor datasets. Therefore, taking the characteristics of various vehicle control devices composing the vehicle control device group 110, delay time may be altered as necessary.

In the second and third embodiments, as contents registered in the correspondence tables 313 and 412, respectively, sensor datasets indicating changes of a value detected by the accelerator sensor and control datasets indicating changes of the amount of control of the engine control device, reflecting changes of the sensor datasets after the input thereof, are defined, as shown in FIG. 7. In addition, as contents registered in the correspondence tables 313 and 412, sensor datasets indicating changes of a value detected by the steering sensor and control datasets indicating changes of the amount of control of the VSC control device reflecting changes of the sensor datasets after the input thereof are defined. The invention is not limited to these, and contents registered in the correspondence tables may be any contents as long as they indicate the correspondence between a sensor dataset and a control dataset that are highly correlated with each other. For example, such contents may be a sensor dataset input to a certain vehicle control device and a control dataset output from this vehicle control device.

In the second and third embodiments, the data analysis sections 300 and 400 are provided with the correspondence tables 313 and 412, respectively, in which sensor datasets and control datasets highly correlated with the sensor datasets are related to each other. The invention is not limited to these, and the correspondence tables 313 and 412 may be omitted. Instead, as a sensor dataset and a control dataset highly correlated with each other, a sensor dataset and a control dataset that are similar to each other in time-series changes and have a predetermined time difference between them may be retrieved from the analytical data storage device 220 and these data may be represented in correspondence with each other. Similarly, as sensor datasets and control datasets highly correlated with each other, sensor datasets and control datasets similar to each other in time-series changes may be retrieved from the analytical data storage device 220 and they may be represented in correspondence with each other. Alternatively, each of the data analysis sections 300 and 400 may execute a computation that includes a conditional formula provided for deriving a sensor dataset and control dataset highly correlated with each other. From this computation, a sensor dataset and a control dataset corresponding to the sensor dataset may be represented in correspondence with each other.

In the third embodiment, the difference between the sensor datasets and the control datasets corresponding to the sensor datasets is calculated based on a sensor dataset and control dataset that have been subjected to frequency analysis. The invention is not limited to this and, as long as the difference between the sensor and control datasets is calculated, any method of calculating the difference may be used, as necessary.

Figure 14:
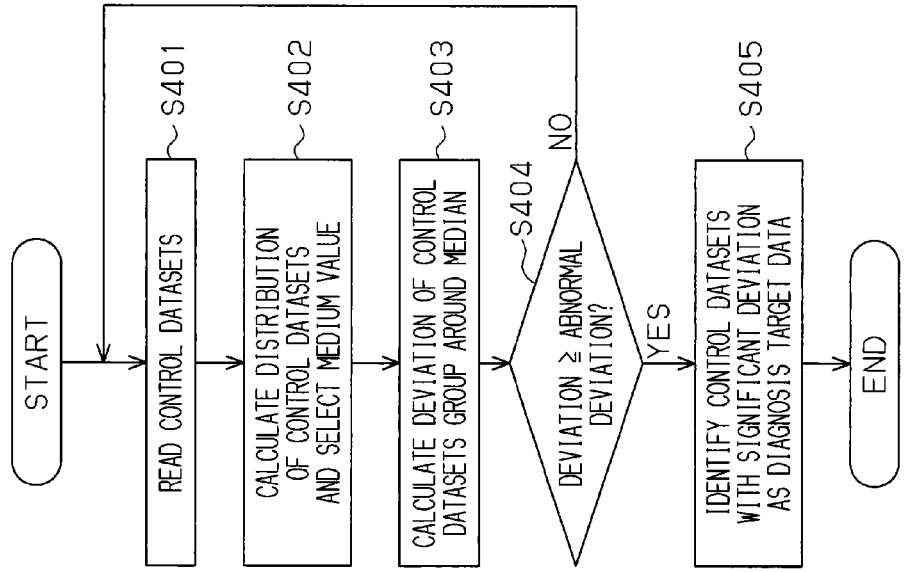
FIG. 14 is a flowchart showing an example of a vehicle data analysis procedure and fault diagnosis procedure in another embodiment of a vehicle data analysis apparatus, vehicle data analysis method, and fault diagnosis apparatus according to the present invention.

In the second embodiment, a normal distribution of sensor datasets is obtained as a computation to uncover a data fluctuation resulting from a mechanical or control-related abnormality in the vehicle control system. A control dataset group corresponding to the sensor dataset group located around the median of this normal distribution is identified. Next, a control dataset that has a significant deviation among the identified control datasets is identified as a vehicle dataset to be subject to diagnosis. However, the invention is not limited to this, and a normal distribution of control datasets may be obtained as a computation to uncover the data fluctuation. Specifically, in this case, as shown in FIG. 14 corresponding to FIG. 8 described above, control datasets output from the vehicle control device, which are to be subject to diagnosis, are read from the analytical data storage device 220 in step S401. A normal distribution of the read control datasets is obtained, and a control dataset group located around the median of the obtained normal distribution is selected (step S402). Subsequently, the deviation of each control dataset of the selected control dataset group located around the median is calculated (step S403). Next, a determination is made whether the calculated deviation of each control dataset is equal to or greater than an abnormality threshold value that indicates an abnormal deviation used to determine whether the control dataset includes any data fluctuation resulting from a mechanical or control-related abnormality in a vehicle control system (step S404). As a result, if there is any control dataset with a deviation equal to or greater than the abnormal deviation threshold value, the control dataset with the deviation is identified as a control dataset to be subject to diagnosis (YES in step S404, S405). In this case also, the control dataset group to be calculated for deviation is limited in advance to a vehicle data group that exhibits the average change. This makes it possible to uncover, among this limited control dataset group, a control dataset that includes a data fluctuation resulting from a mechanical or control-related abnormality in the vehicle control system. In this case, obtaining a control dataset only as an analysis target suffices, thereby eliminating the need for the process of associating the sensor dataset and the control dataset corresponding to the sensor dataset. Accordingly, a control dataset to be subject to diagnosis may be identified through the more simplified process.

In the second embodiment, as a computation to uncover a data fluctuation resulting from a mechanical or control-related abnormality in the vehicle control system, a normal distribution of the vehicle data is obtained. The invention is not limited to this, and a chi-squared distribution of the vehicle data may be obtained as a representative example of the statistical distribution of the vehicle data. Any computation to obtain a statistical distribution of the vehicle data may be applied in the present invention.

In the first embodiment, as a computation to uncover a data fluctuation resulting from a mechanical or control-related abnormality in the vehicle control system, the amount of change per unit time in control datasets is obtained. In the second embodiment, as a computation to uncover the data fluctuation, a normal distribution of the sensor datasets is obtained. In the third embodiment, as a computation to uncover the data fluctuation, the difference between a sensor dataset and the control dataset is obtained. The invention is not limited to this, and, for example, the computing section may be provided with the function of categorizing the control datasets stored in the analytical data storage device 220, according to a running condition for the vehicle C. Alternatively, as a computation to uncover data fluctuation resulting from a mechanical or control-related abnormality in the vehicle control system, a computation to categorize the vehicle data according to a running condition for the vehicle C may be made.

Figure 15:
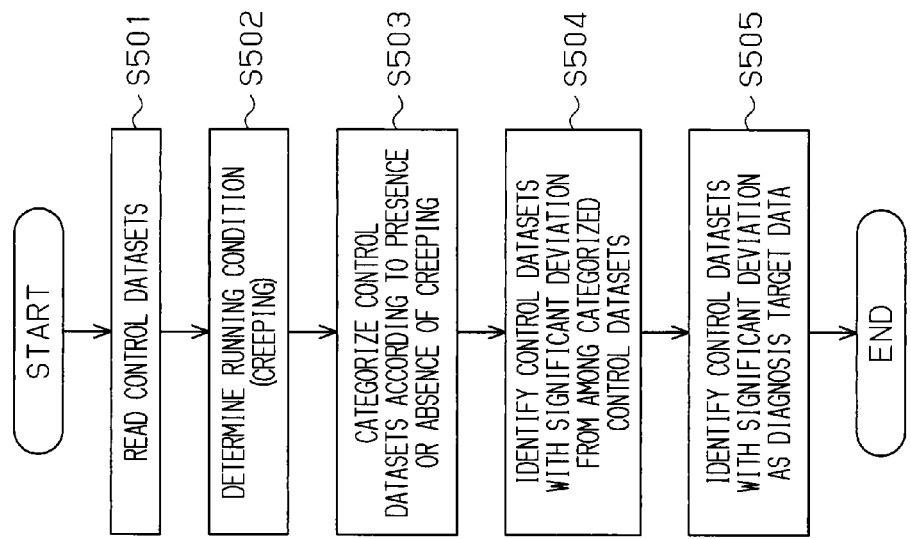
FIG. 15 is a flowchart showing an example of a vehicle data analysis procedure and fault diagnosis procedure in another embodiment of a vehicle data analysis apparatus, vehicle data analysis method, and fault diagnosis apparatus according to the present invention.

For example, as shown in FIG. 15, upon reading the control datasets stored in the analytical data storage device 220, the computing section of this modification first determines the running condition for the vehicle C in order to categorize the vehicle data (Steps S501 and S502). In this embodiment, for example, where control datasets indicate changes of the amount of control of the engine control device, the presence or absence of the idling of the engine after the ignition key of the vehicle C is turned to the on-position, that is, the presence or absence of creeping is used as a running condition. Based on whether creeping has continued for a predetermined period after the ignition key of the vehicle C is turned to the on-position, the computing section categorizes the control datasets indicating changes of the amount of control of the engine control device (step S503).

Next, as shown in FIG. 16, the control datasets are categorized into a group Gc1 that does not include creeping and a group Gc2 that includes creeping. Specifically, the patterns of changes of the control datasets stored in the analytical data storage device 220 are categorized into two types: the group Gc1 in which, since creeping are not included, time-series changes are similar; and the group Gc2 in which, since creeping are included, the time-series changes are similar but different from those in the group Gc1.

Thereafter, as shown in FIG. 15, the computing section identifies a control dataset with significant deviation in each of the groups Gc1 and Gc2 into which the control datasets are categorized (step S504). That is, the presence or absence of creeping is determined by the amount of depression of the accelerator pedal by a driver. Therefore, categorizing the control datasets based on the determination of the presence or absence of creeping is categorizing the control datasets according to the amount of depression of the accelerator pedal by a driver. For this reason, the degree of influence of the amount of depression of the accelerator pedal by the driver on the control datasets is reduced in each of the groups Gc1 and Gc2 as categories. Therefore, control datasets that significantly deviate in each of the groups Gc1 and Gc2, into which the control datasets are categorized based on the determination of the presence or absence of creeping, include a factor different from the presence or absence of creeping. That is, since these control datasets include a data fluctuation resulting from a mechanical or control-related abnormality in the vehicle control system, it is highly probable that deviation may have occurred. Therefore, in this case, a control dataset that has a relatively significant deviation in each of the groups Gc1 and Gc2 as categories is identified as a control dataset reflecting the mechanical or control-related abnormality in the vehicle control system, that is, a control dataset to be subject to diagnosis (step S505).

In this case, prior to the calculation of the respective deviations of the control datasets, the control datasets are categorized in advance according to the amount of depression of the accelerator pedal by the driver. Accordingly, for example, a difference in the amount of depression of the accelerator pedal is derived as the deviation of each control dataset. Accordingly, the degree of influence of data fluctuation resulting from a mechanical or control-related abnormality in the vehicle control system is increased on the categorized control datasets, and hence the data fluctuation may be uncovered.

As another running condition for the vehicle C, any condition reflecting the driver's operation of the vehicle suffices. For example, a running condition may be based on whether the environment where the vehicle C runs is urban or suburban, or is ordinary vehicle road or automobile expressway. Similarly, a running condition for the vehicle C may be the presence or absence of running assistance by car navigation, a vehicle type, weather, or the like. In short, the influence of the driver's operation of the vehicle on the categorized control datasets is reduced by categorizing the control datasets according to a common running condition. Accordingly, by uncovering a data fluctuation resulting from a mechanical or control-related abnormality in the vehicle control system, which is included in the control datasets; it may be used as a running condition for the vehicle.

In each embodiment described above, description has been given using an example in which one sensor dataset is input for one vehicle control device. However, the number of sensor datasets input to the vehicle control device may be two or more. In this case, since the vehicle control device determines the amount of control based on each of the input sensor datasets, control datasets exhibiting changes of the amount of control are a combination of changes of sensor datasets. In this case, the computing section according to the second embodiment executes a computation to obtain the statistical distribution of each of the sensor datasets input to one vehicle control device or a computation to obtain the statistical distribution of a combination of the sensor datasets. In this case, the computing section according to the third embodiment executes a computation to obtain the difference between a sensor dataset selected from sensor datasets input to the one vehicle control device and the control datasets output from the vehicle control device. Alternatively, the computing section according to the third embodiment executes a computation to obtain the difference between the data created by combining sensor datasets input to one vehicle control device and the control datasets output from the vehicle control device.

In each embodiment described above, a vehicle dataset to be subject to diagnosis is identified from the vehicle data obtained from one vehicle C. The invention is not limited to this. The fault diagnosis apparatus 200 may retrieve vehicle data from a plurality of vehicles C, store the vehicle data in the analytical data storage device 220, and extract, from the vehicle data stored in this analytical data storage device 220, vehicle data that includes a data fluctuation resulting from a mechanical or control-related abnormality in a vehicle control system.

In each embodiment, sensor datasets and control datasets accumulated in the vehicle storage device 120 of the vehicle C are transferred to the fault diagnosis apparatus 200 via wire communication. However, the invention is not limited to this. The vehicle C and the fault diagnosis apparatus 200 may be provided with wireless communication devices capable of communicating with each other, and sensor datasets and control datasets accumulated in the vehicle storage device 120 of the vehicle C may be transferred to the fault diagnosis apparatus 200 from the vehicle C via wireless communication between the wireless communication devices. In this case, even if the vehicle C is not equipped with the fault diagnosis apparatus 200, fault diagnosis of the vehicle C can be dynamically carried out based on the sensor datasets and control datasets obtained from the vehicle C. Accordingly, a fault diagnosis in the vehicle C may be carried out flexibly, and a fault in the vehicle C may be discovered at an early stage.

In each embodiment described above, the fault diagnosis apparatus 200 is provided outside the vehicle C. However, the fault diagnosis apparatus 200 may be mounted inside the vehicle C, and a fault diagnosis inside the vehicle C may be carried out any time by this apparatus 200. In this case, the vehicle storage device 120 mounted in the vehicle C may be omitted, and sensor datasets and control datasets output from the sensor group 100 and vehicle control device group 110 respectively may be retrieved into the fault diagnosis apparatus 200 directly. As with the first embodiment, where a data fluctuation including a mechanical or control-related abnormality in a vehicle control system is uncovered by obtaining the amount of change per unit time in control datasets, the configuration may omit the vehicle storage device 120 and/or analytical data storage device 220. In this case, the computing section sequentially retrieves control datasets output from the vehicle control device group 110, and sequentially calculates the amounts of change per unit time in the retrieved control datasets. Similarly, as with the third embodiment, where a data fluctuation including a mechanical or control-related abnormality in a vehicle control system is uncovered by obtaining the difference between a sensor dataset and a control dataset corresponding to the sensor dataset, the configuration may omit the vehicle storage device 120 and/or analytical data storage device 220. In this case, the computing section sequentially retrieves sensor datasets output from the sensor group 100 and the control datasets output from the vehicle control device group 110, and sequentially calculates the differences between the retrieved sensor datasets and the control datasets corresponding to the sensor datasets.

In each embodiment, a sensor dataset for the sensor group 100 is defined as a dataset reflecting the character of the driver's operation of the vehicle C after the input of this dataset to the vehicle control device 100. In the second and third embodiments, using a correlation between the sensor dataset and the control dataset, a data fluctuation resulting from a mechanical or control-related abnormality in a vehicle control system is uncovered. However, the invention is not limited to this. For example, when the amount of control of a second vehicle control device is determined based on the amount of control of a first vehicle control device, which amount is determined based on the sensor dataset from a certain sensor, a computation may be made to uncover the data fluctuation based on the control dataset of the first vehicle control device, which control dataset serves as a dataset input to the second vehicle control device, and based on the control dataset of the second vehicle control device, which control dataset serves as a dataset output from the second vehicle control device. In this case, a computation to uncover the data fluctuation may be made based on the sensor dataset input to the first vehicle control device, and based on the control dataset of the second vehicle control device, which control dataset serves as a dataset output from the second vehicle control device. Accordingly, based on an input system dataset serving as a determination reference for the amount of change of each vehicle control device, and based on an output system dataset indicating changes of the amount of control determined by the input system data, it is possible to uncover an abnormal data fluctuation included in the vehicle data given or received in the vehicle control system in which various vehicle-mounted apparatuses and systems are controlled in cooperation with a plurality of sensors and a plurality of vehicle control devices. In this case, the input system dataset and output system dataset serve as the vehicle data described above.

DESCRIPTION OF THE REFERENCE NUMERALS

100 SENSOR GROUP
110 VEHICLE CONTROL DEVICE GROUP
120 VEHICLE STORAGE DEVICE
200 FAULT DIAGNOSIS APPARATUS
210 DATA INPUT DEVICE
220 ANALYTICAL DATA STORAGE DEVICE
230 DATA ANALYSIS SECTION
231 COMPUTING SECTION
231a CONTROL AMOUNT CALCULATING SECTION
232 RECOGNIZING SECTION
240 ABNORMALITY DIAGNOSIS SECTION
300 DATA ANALYSIS SECTION
310 COMPUTING SECTION
311 DISTRIBUTION CALCULATING SECTION
312 MEDIUM VALUE SELECTING SECTION
313 CORRESPONDENCE TABLE
320 RECOGNIZING SECTION
400 DATA ANALYSIS SECTION
410 COMPUTING SECTION
411 CORRELATED DATA ASSOCIATING SECTION
412 CORRESPONDENCE TABLE
413 SENSOR DATASET FREQUENCY ANALYSIS SECTION
414 CONTROL DATASET FREQUENCY ANALYSIS SECTION
415 DIFFERENCE CALCULATING SECTION
420 RECOGNIZING SECTION
C VEHICLE

The invention claimed is:

1. A vehicle data analysis apparatus for analyzing vehicle data indicating time-series changes of a state of a vehicle, the apparatus comprising:
   a storage device in which a plurality of the vehicle data obtained from the vehicle are accumulated as data to be analyzed;
   a computing section configured to uncover a data fluctuation in each of the plurality of the vehicle data accumulated in the storage device that results from a mechanical or control-related abnormality in a vehicle control system and calculate an amount of change per unit time of the vehicle data; and
   a recognizing section configured to recognize, based on a computation result obtained by the computing section, vehicle data to be subject to a diagnosis of the abnormality in the vehicle as a diagnosis target by excluding the data including the amount of change smaller than a threshold showing the data fluctuation resulting from a driver's operation of the vehicle from the data fluctuation included in the vehicle data,
   wherein the recognizing section is configured to use the threshold set to exclude the data fluctuation resulting from a human factor.

2. The vehicle data analysis apparatus according to claim 1, wherein
   the vehicle data includes, as data reflecting a characteristic of a driver's operation of the vehicle, a sensor dataset and a control dataset, the sensor dataset indicating changes of a value detected by a sensor that detects the state of the vehicle, and the control dataset reflecting changes of the sensor dataset, and
   the recognizing section is configured to, based on the computation result obtained by the computing section, identify, as the diagnosis target, vehicle data that includes a data fluctuation based on a factor different from the driver's vehicle operation of the vehicle.

3. The vehicle data analysis apparatus according to claim 1, wherein
   the computing section also performs a computation to identify vehicle data that indicates that the calculated amount of change is equal to or greater than a threshold value that indicates an amount of change caused by data fluctuation resulting from mechanical or control-related abnormality in the vehicle control system.

4. A fault diagnosis apparatus, comprising:
   the vehicle data analysis apparatus according to claim 1,
   wherein the fault diagnosis apparatus is configured to diagnose the presence or absence of any fault in the vehicle based on the vehicle data analyzed by the vehicle data analysis apparatus.

5. A vehicle data analysis apparatus for analyzing vehicle data indicating time-series changes of a state of a vehicle, the apparatus comprising:
   a storage device in which a plurality of the vehicle data obtained from the vehicle are accumulated as data to be analyzed;
   a computing section configured to uncover a data fluctuation in each of the plurality of the vehicle data accumulated in the storage device that results from a mechanical or control-related abnormality in a vehicle control system, wherein as the computation, the computing section performs a computation for obtaining statistical distribution of the vehicle data stored in the storage device; and
   a recognizing section configured to:
      recognize, based on a computation result obtained by the computing section, vehicle data to be subject to a diagnosis of the abnormality in the vehicle as a diagnosis target by excluding vehicle data deviating from a median in the obtained statistical distribution showing the data fluctuation resulting from a driver's operation of the vehicle from the data fluctuation included in the vehicle data, and
      extract vehicle data that has a relatively large deviation in the recognized vehicle data from the storage device as the diagnosis target vehicle data,
   wherein the recognizing section is configured to use a threshold set to exclude the data fluctuation from a human factor in excluding vehicle data deviating from the median.

6. The vehicle data analysis apparatus according to claim 5, wherein
   the vehicle data includes a sensor dataset that indicates changes of a value detected by a sensor, which detects the state of the vehicle, and a control dataset reflecting, as data corresponding to the sensor dataset, changes of the corresponding sensor dataset, and
   the sensor dataset and the control dataset are associated with each other as a result of determination that they are highly correlated with each other on condition that:
   a. time-series changes correlate with each other; and
   b. delay time of the control dataset with respect to the sensor dataset is within the response time of a vehicle's behavior with respect to the driver's operation of the vehicle, the response time being indicated by the sensor dataset.

7. The vehicle data analysis apparatus according to claim 5, further comprising a correspondence table representing a correspondence between vehicle data of a plurality of types,
   wherein, in the correspondence table, a sensor dataset indicating changes of a value detected by a sensor that detects the state of the vehicle and a control dataset highly correlated with the sensor dataset are related to each other.

8. The vehicle data analysis apparatus according to claim 7, wherein
   in the correspondence table, as a sensor dataset and a control dataset highly correlated with each other, a dataset indicating changes of a value detected from an accelerator pedal of the vehicle and a dataset indicating changes of the amount of control of an engine control device for controlling an engine installed in the vehicle are registered in relation to each other, and
   a dataset indicating changes of the amount of operation of a steering wheel of the vehicle and a dataset indicating changes of the amount of control of a VSC control device for exerting stability control for the vehicle are also registered in relation to each other.

9. A vehicle data analysis apparatus for analyzing vehicle data indicating time-series changes of a state of a vehicle, the apparatus comprising:
   a storage device in which a plurality of the vehicle data obtained from the vehicle are accumulated as data to be analyzed, the vehicle data including a sensor dataset and a control dataset;
   a computing section configured to uncover a data fluctuation in each of the plurality of the vehicle data accumulated in the storage device that results from a mechanical or control-related abnormality in a vehicle control system and obtain, in the computation, a difference between the sensor dataset and the control dataset correlated with the sensor dataset; and a recognizing section configured to:

recognize, based on a computation result obtained by the computing section, vehicle data to be subject to a diagnosis of the abnormality in the vehicle as a diagnosis target by excluding a sensor dataset and a control dataset whose difference is not equal to or greater than a threshold showing the data fluctuation resulting from a driver's operation of the vehicle from the data fluctuation included in the vehicle data, and recognize the diagnosis target vehicle data based on the obtained difference, wherein the recognizing section is configured to use the threshold set to exclude the data fluctuation resulting from a human factor.

10. The vehicle data analysis apparatus according to claim 9, wherein the computing section calculates the difference between the sensor dataset and the control dataset corresponding to the sensor dataset based on the sensor dataset and the control dataset that have been subjected to frequency analysis.

11. The vehicle data analysis apparatus according to claim 9, wherein the sensor dataset and the control dataset are associated with each other as a result of determination that they are highly correlated with each other on condition that:

a. time-series changes correlate with each other; and b. delay time of the control dataset with respect to the sensor dataset is within the response time of a vehicle's behavior with respect to the driver's operation of the vehicle, the response time being indicated by the sensor dataset.

12. A vehicle data analysis method for analyzing vehicle data indicating time-series changes of a state of a vehicle using a vehicle data analysis apparatus, the method comprising:

accumulating a plurality of the vehicle data obtained from the vehicle in a storage device as data to be analyzed;

uncovering a data fluctuation in each of the plurality of the vehicle data that results from a mechanical or control-related abnormality in a vehicle control system;

calculating an amount of change per unit time of the vehicle data;

identifying the vehicle data as a diagnosis target to diagnose the abnormality in the vehicle by excluding the data including the amount of change smaller than a threshold showing the data fluctuation resulting from a driver's operation of the vehicle from the data fluctuation included in the vehicle data; and using the threshold set to exclude the data fluctuation resulting from a human factor.

13. The vehicle data analysis method according to claim 12, wherein the identification is to select vehicle data that indicates that the calculated amount of change per unit time in the vehicle data is equal to or greater than a threshold value that indicates an amount of change caused by data fluctuation resulting from the mechanical or control-related abnormality in the vehicle control system.

14. A vehicle data analysis method for analyzing vehicle data indicating time-series changes of a state of a vehicle using a vehicle data analysis apparatus, the method comprising:

accumulating a plurality of the vehicle data obtained from the vehicle in a storage device as data to be analyzed, wherein the vehicle data includes, as data reflecting a characteristic of a driver's operation of the vehicle, a sensor dataset and a control dataset, the sensor dataset indicating changes of a value detected by a sensor that detects the state of the vehicle, and the control dataset reflecting changes of the sensor dataset;

uncovering a data fluctuation in each of the plurality of the vehicle data that results from a mechanical or control-related abnormality in a vehicle control system; and identifying the vehicle data as a diagnosis target to diagnose the abnormality in the vehicle by excluding the data fluctuation resulting from a driver's operation of the vehicle from the data fluctuation included in the vehicle data, wherein the identifying includes:

excluding a sensor dataset and a control dataset whose difference is not equal to or greater than a threshold, and identifying, as the diagnosis target, vehicle data that includes a data fluctuation based on a factor different from the driver's vehicle operation of the vehicle, and using the threshold set to exclude the data fluctuation resulting from a human factor.

15. The vehicle data analysis method according to claim 14, wherein the uncovering is to uncover a data fluctuation resulting from the mechanical or controls-related abnormality in the vehicle control system based on a difference between the sensor dataset and the control dataset correlated with the sensor dataset.

16. The vehicle data analysis method according to claim 15, wherein the uncovering is to subject the sensor dataset and the control dataset corresponding to the sensor dataset to frequency analysis and to calculate the difference between the sensor dataset and the control dataset based on the sensor dataset and the control dataset that have been subjected to the frequency analysis.

17. A vehicle data analysis method for analyzing vehicle data indicating time-series changes of a state of a vehicle using a vehicle data analysis apparatus, the method comprising:

accumulating a plurality of the vehicle data obtained from the vehicle in a storage device as data to be analyzed;

uncovering a data fluctuation in each of the plurality of the vehicle data that results from a mechanical or control-related abnormality in a vehicle control system, wherein the uncovering is to obtain statistical distribution of the stored vehicle data; and identifying the vehicle data as a diagnosis target to diagnose the abnormality in the vehicle by excluding the data fluctuation resulting from a driver's operation of the vehicle from the data fluctuation included in the vehicle data, wherein the identifying includes:

excluding vehicle data deviating from a median in the vehicle data represented as a statistical distribution and identifying vehicle data that has a relatively large deviation among the recognized vehicle data as the diagnosis target vehicle data, and using a threshold set to exclude the data fluctuation resulting from a human factor in excluding vehicle data deviating from the median.

* * * * *